United States Patent [19]
Gardenswartz et al.

[11] Patent Number: 6,055,573
[45] Date of Patent: Apr. 25, 2000

[54] COMMUNICATING WITH A COMPUTER BASED ON AN UPDATED PURCHASE BEHAVIOR CLASSIFICATION OF A PARTICULAR CONSUMER

[75] Inventors: Will H. Gardenswartz, Annapolis, Md.; David W. Banker, Mt. Baldy, Calif.; Melissa B. Goidel, New York, N.Y.

[73] Assignee: SuperMarkets Online, Inc., Greenwich, Conn.

[21] Appl. No.: 09/226,174

[22] Filed: Jan. 7, 1999

Related U.S. Application Data

[60] Provisional application No. 60/114,462, Dec. 30, 1998.

[51] Int. Cl.$^7$ ..................................................... G06F 13/00
[52] U.S. Cl. .......................... 709/224; 709/219; 709/223; 705/26
[58] Field of Search .................................... 709/201, 202, 709/206, 217, 218, 219, 223, 224; 705/26, 27, 10, 1; 707/10

[56] References Cited

U.S. PATENT DOCUMENTS

| | | |
|---|---|---|
| 4,882,675 | 11/1989 | Nichtberger et al. . |
| 5,056,019 | 10/1991 | Schultz et al. . |
| 5,201,010 | 4/1993 | Deaton et al. . |
| 5,237,620 | 8/1993 | Deaton et al. . |
| 5,249,044 | 9/1993 | Von Kohorn . |
| 5,283,731 | 2/1994 | Lalonde et al. . |
| 5,285,278 | 2/1994 | Holman . |
| 5,287,181 | 2/1994 | Holman . |
| 5,305,196 | 4/1994 | Deaton et al. . |
| 5,353,218 | 10/1994 | De Lapa et al. . |
| 5,380,991 | 1/1995 | Valencia et al. . |
| 5,459,306 | 10/1995 | Stein et al. . |
| 5,483,049 | 1/1996 | Schulze, Jr. . |
| 5,592,560 | 1/1997 | Deaton et al. . |
| 5,621,812 | 4/1997 | Deaton et al. . |
| 5,636,346 | 6/1997 | Saxe ............................................ 705/1 |

(List continued on next page.)

FOREIGN PATENT DOCUMENTS

| | | |
|---|---|---|
| 0 512 509 A2 | 11/1992 | European Pat. Off. . |
| 0 822 535 A2 | 2/1998 | European Pat. Off. . |
| 196 41 092 A1 | 4/1998 | Germany . |
| WO 97/12486 | 4/1997 | WIPO . |
| WO 97/23838 | 7/1997 | WIPO . |
| WO 98/15907 | 4/1998 | WIPO . |

OTHER PUBLICATIONS

IntelliQuest Looks for Interaction with Loyalty, Web Traffic Programs, Electronic Advertising & Marketplace Report, Lexis–Nexis, Oct. 20, 1998.

IntelliQuest and CoolSavings Offer Innovative Online Customer Relationship Management Program for Technology Vendors, Business Editors & Technology Writers, Lexis–Nexis, Sep. 30, 1998.

In this Computer Age, Who Needs Coupons?, The New York Times, Jun. 15, 1989[1].

*Primary Examiner*—Viet D. Vu
*Attorney, Agent, or Firm*—Oblon, Spivak, McClelland, Maier & Neustadt, P.C.

[57] ABSTRACT

A method, system, and computer program product for delivering a targeted advertisement. A first identifier, such as a cookie, corresponding to the a first computer is received from the first computer. A targeted advertisement is delivered to the first computer in response to receiving the first identifier from the first computer. The targeted advertisement is based on the observed offline purchase history of a consumer associated with the first identifier. The invention includes the delivery of a promotional incentive for a consumer to comply with a particular behavioral pattern. The behavioral pattern may be a predefined change in purchase behavior or continuance of an established purchase behavior. The targeted advertisements sent to consumers may be changed and/or refined based on changes in consumers' purchase history behaviors.

12 Claims, 11 Drawing Sheets

U.S. PATENT DOCUMENTS

| | | | |
|---|---|---|---|
| 5,642,485 | 6/1997 | Deaton et al. . | |
| 5,644,723 | 7/1997 | Deaton et al. . | |
| 5,649,114 | 7/1997 | Deaton et al. . | |
| 5,687,322 | 11/1997 | Deaton et al. . | |
| 5,724,521 | 3/1998 | Dedrick | 705/26 |
| 5,761,648 | 6/1998 | Golden et al. . | |
| 5,806,044 | 9/1998 | Powell . | |
| 5,809,242 | 9/1998 | Shaw et al. | 709/217 |
| 5,809,481 | 9/1998 | Baron et al. | 705/14 |
| 5,832,457 | 11/1998 | O'Brien et al. . | |
| 5,845,396 | 12/1998 | Gerace . | |
| 5,852,775 | 12/1998 | Hidary | 455/404 |
| 5,855,007 | 12/1998 | Jovicic et al. . | |
| 5,855,008 | 12/1998 | Goldhaber et al. . | |
| 5,857,175 | 1/1999 | Day et al. . | |

| | | | | |
|---|---|---|---|---|
| Customer Identification: 987-654-321 | | | | |
| Brand Z Soda 6-Pack, 12 0z Cans | 123456789 | Retailer X | 9.99 | 12/4/97 |
| Brand Z Soda 6-Pack, 12 0z Cans | 123456789 | Retailer X | 9.99 | 12/8/97 |
| Brand Z Soda 6-Pack, 12 0z Cans | 123456789 | Wholesale Club Y | 9.49 | 12/10/97 |
| Brand Y Macaroni and Cheese | 987654321 | Retailer X | 2.99 | 4/4/97 |

Figure 2(a)

| SKU | UPC Code | Store/Chain | Price | Date |
|---|---|---|---|---|
| 34 | 35 | 36 | 37 | 38 |

Figure 2(b)

COMMUNICATING WITH A COMPUTER BASED ON AN UPDATED PURCHASE BEHAVIOR CLASSIFICATION OF A PARTICULAR CONSUMER

CROSS-REFERENCE TO RELATED APPLICATIONS

This application claims priority from U.S. Provisional Application Ser. No. 60/114,462, filed Dec. 30, 1998, which is incorporated herein by reference.

BACKGROUND OF THE INVENTION

1. Field of the Invention

The present invention relates generally to the use of a computer network, and more specifically to a method, system, and computer program product for communicating with a computer associated with a particular consumer, based on the consumer's offline purchase history.

As used herein, the term "online" refers to activity having at least one aspect that is performed over a computer network, whereas the term "offline" refers to customer activity that is generally not performed over a computer network. For example, using a computer to buy books over the Internet is an online purchase, whereas buying groceries in a grocery store is an offline purchase.

2. Discussion of the Background

With the proliferation of computer networks such as the Internet, more and more households are able to access wide varieties of information quickly and easily with their home (or work) computers. The increasing number of ordinary consumers who are now accessing the Internet has opened up a new avenue through which commercial entities can deliver their advertisements to consumers. Through computer networks such as the Internet, advertisers are able to display banners to computer users for purposes of generating brand name recognition, distributing promotional information, etc.

As evidenced by the numerous amount of literature in the field, skilled computer programmers have developed and refined a variety of methods for accessing, manipulating, and disseminating database information over computer networks such as the Internet. Thus, various methods of storing, delivering, and displaying information are well-known in the field of computer networking. Similarly, standard protocols and architecture have been developed to communicate over wide area networks (WANs); for example, TCP/IP protocols and architecture have been developed for communication over the Internet. Moreover, various languages such as Java Database Connectivity (JDBC) have been developed for performing database operations over computer networks. The design and implementation of various methods of database networking and Internet communications are described in Liu et al., "Managing Internet Information Services," O'Reilly & Associates, Inc., 1994; Comer, "Internet Working with TCP/IP Volume I: Principles, Protocols, and Architecture," $2^{nd}$ ed., Prentice-Hall, Inc., 1991; Comer and Stevens, "Internet Working with TCP/IP Volume II: Design, Implementation, and Internals," Prentice-Hall, Inc., 1991; Comer and Stevens, "Internet Working with TCP/IP Vol. III: Client-Server Programming and Applications," Prentice-Hall, Inc., 1993; Khoshafian et al., "A Guide to Developing Client/Server SQL Applications," Morgan Kaufmann Publishers, Inc.; Hamilton et al., "JDBC Database Access with Java, A Tutorial and Annotated Reference," Addison-Wesley Pub. Co., 1997; and Francis et al., "Professional Active Server Pages 2.0," Wrox Press Ltd., 1998; each of which is incorporated herein by reference.

Currently, advertisers are able to implement a limited form of targeted advertising over the Internet. This is accomplished by sending a block of data, such as a "cookie," from a remote host or server (i.e., a Web server) maintained by an advertiser to a computer (i.e., a client system) that has access to the remote server via the World Wide Web. A cookie, as used in network and Internet communication, is a block of data or state object that a Web server stores on a client system. When the client system accesses a Web site within a limited range of domain names, the client system automatically transmits a copy of the cookie to the Web server that serves the Web site. The cookie may include a unique cookie number corresponding to the client system. Thus, the cookie can be used to identify the client system (by identifying the Web browser) and to instruct the server to send a customized copy of the requested Web page to the Web browser.

Since cookies are also used to track a consumer's online activity, a Web server can deliver targeted advertisements to a consumer's Web browser, based on the consumer's online activity. For example, if a cookie tracks the various IP addresses accessed by the consumer's computer, the Web server can deliver ad banners to the consumer's Web browser based on the IP addresses the Web browser has accessed. Thus, the cookie can be used to record the online activity of a consumer, and information regarding the consumer's tastes and tendencies can be inferred from the consumer's online activity. Using this inference, an advertiser can try to target specific advertisements to specific computer consumers, based on the record of the computer consumers' online activities. That is, the advertiser can try to expose the computer consumers to advertisements designed to appeal to their particular tastes and interests.

The targeted advertisement can be implemented in several manners. For example, the advertiser can generate Internet banners that contain targeted ads and are visible to the consumer when the consumer accesses the advertiser's server, and/or the advertiser can automatically generate e-mail messages and send them to the consumer if the advertiser has the consumer's e-mail address.

The disadvantage of generating advertisements based on online activity resides in the fact that a consumer's actions on the Internet (which are known to advertisers because of the cookie sent to the consumer's computer) may not be strongly related to the consumer's preferences as a consumer in the offline world. Thus, a consumer's activity on the Internet, including online purchases and access to various Web sites, may not reflect what the consumer will buy at a shopping mall or supermarket. For example, just because the consumer has accessed a large number of IP addresses corresponding to fly fishing Web pages, there is no indication that the consumer prefers one brand of diet soda over any other.

SUMMARY OF THE INVENTION

Accordingly, one object of this invention is to provide a novel method, system, and computer program product for delivering targeted advertisements to a consumer based on his or her offline purchase history.

It is another object of the present invention to provide a novel method, system, and computer program product for associating a consumer's offline purchase history with a particular computer used by the consumer.

It is another object of the present invention to provide a novel method, system, and computer program product for providing advertisers with information relating to consumers' observed offline purchase histories without divulging to the advertisers the proprietary information of another, such as the consumers' customer identifications (CIDs).

These and other objects are achieved according to the present invention by providing a novel method, system, and computer program for delivering a targeted advertisement. The targeted advertisement is selected based on a demonstrated purchase behavior of the consumer including an actual, monitored, or observed offline purchase history associated with the consumer. The targeted advertisement is then electronically delivered to a computer associated with the consumer. Thus, with the present invention it is unnecessary to make inferences about the consumer's offline purchase behavior in selecting the targeted advertisement because the targeted advertisement has been selected based on the observed offline purchase history of the consumer.

In an embodiment of the invention, the computer sends a first identifier to an advertiser. The first identifier is preferably a cookie or any other type of identification information which identifies the computer or consumer. The first identifier is also associated with the consumer's observed offline purchase history which permits targeted advertisements to be delivered to the computer in response to receiving the first identifier from the computer. Accordingly, the targeted advertisement may be sent at times when the computer is known to be online. Further, the targeted advertisements may be sent to the computer from various locations and/or devices, including any device capable of receiving the first identifier and identifying the computer.

In another embodiment of the invention, the consumer provides a second identifier to a registration server. The second identifier is preferably a CID, a bar code, or other string of characters or digital information that identifies the consumer. The registration server associates the first and second identifiers by linking the first identifier and the second identifier in a memory. With this embodiment, it is not necessary that the advertiser delivering the targeted advertisements be provided with the second identifier since the registration server use the first identifier to identify the consumer to the advertiser. Thus, if the second identifier is proprietary, it does not have to be shared with the advertiser for the advertiser to deliver targeted advertisements to the consumer.

In yet another embodiment of the invention, the consumer is classified by assigning to the consumer a purchase behavior classification. The purchase behavior classification is based on selected purchase behavior criterion and the consumer's observed offline purchase history. The targeted advertisement is selected based on the purchase behavior classification assigned to the consumer. Thus, an advertiser can select targeted advertisements to deliver based on the consumer's purchase history classifications, and the consumer's observed offline purchase history does not have to be provided to the advertiser for the advertiser to deliver targeted advertisements. Preferably, one or more classifications are stored as data fields in a single record corresponding to the consumer. This record is generically called a "targeted ad profile."

According to a further embodiment of the invention, the targeted advertisement is a promotional incentive generically termed a "value contract." The value contract offers the consumer a reward for complying with a given type of behavior. This behavior may be a predefined change in behavior or continuance of an established behavior. Preferably, the behavior is defined as a minimum number of purchases that must be made within a predetermined time period. Accordingly, it is possible to deliver promotional incentives that are targeted based on the observed offline purchase history of consumers. Further, the delivery of promotional incentives to certain consumers may be avoided. Consumers for which delivery is to be avoided may include consumers who already comply with the behavior or consumers whose purchase histories demonstrate a reluctance to remain loyal to a particular brand. Once a consumer wins a reward, the reward is preferably presented to the consumer in a retail store. Thus, the reward provides an incentive for the consumer to visit the retail store.

In another embodiment, the consumer is reclassified by assigning to the consumer an updated purchase behavior classification. The updated purchase history behavior criterion is based on the selected purchase behavior criterion and the consumer's updated observed offline purchase history. The targeted advertisement (e.g., a value contract) to be delivered is reselected based on the updated purchase behavior classification. Accordingly, the targeted advertisements delivered to the consumer can be updated to reflect changes in the consumer's behavior. Moreover, the effect of different marketing strategies may be monitored by tracking consumers' responses to being presented with different advertisements.

In yet a further embodiment of the invention, the consumer in a particular purchase history classification receives a unique personal identification number (PIN) based on his or her purchase behavior classification. The consumer receives the PIN from a computer generated printout at a cash register, in an e-mail, or off of a personalized Web page, for example. The consumer is also provided with a telephone number of an interactive voice response (IVR) provider. If the consumer telephones the IVR provider and provides his or her PIN to the IVR provider, then a targeted message, such as an IVR message, is initiated. PINs may also be received from a computer operated by the consumer, in which case targeted messages are delivered to the consumer over a computer network. The targeted messages correspond to the purchase behavior classifications of consumers and include targeted advertisements, promotional offers, and/or instructions on how to receive a reward. If desired, consumers are rewarded for providing their PINs and receiving targeted messages.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2(a) is a drawing of a data structure for storing the offline purchase history of a particular consumer in the purchase history database 8 of FIG. 1;

FIG. 2(b) is a drawing of a data record for recording purchase information associated with a single purchase in the data structure of FIG. 2(a);

DESCRIPTION OF THE PREFERRED EMBODIMENTS

Figure 1:
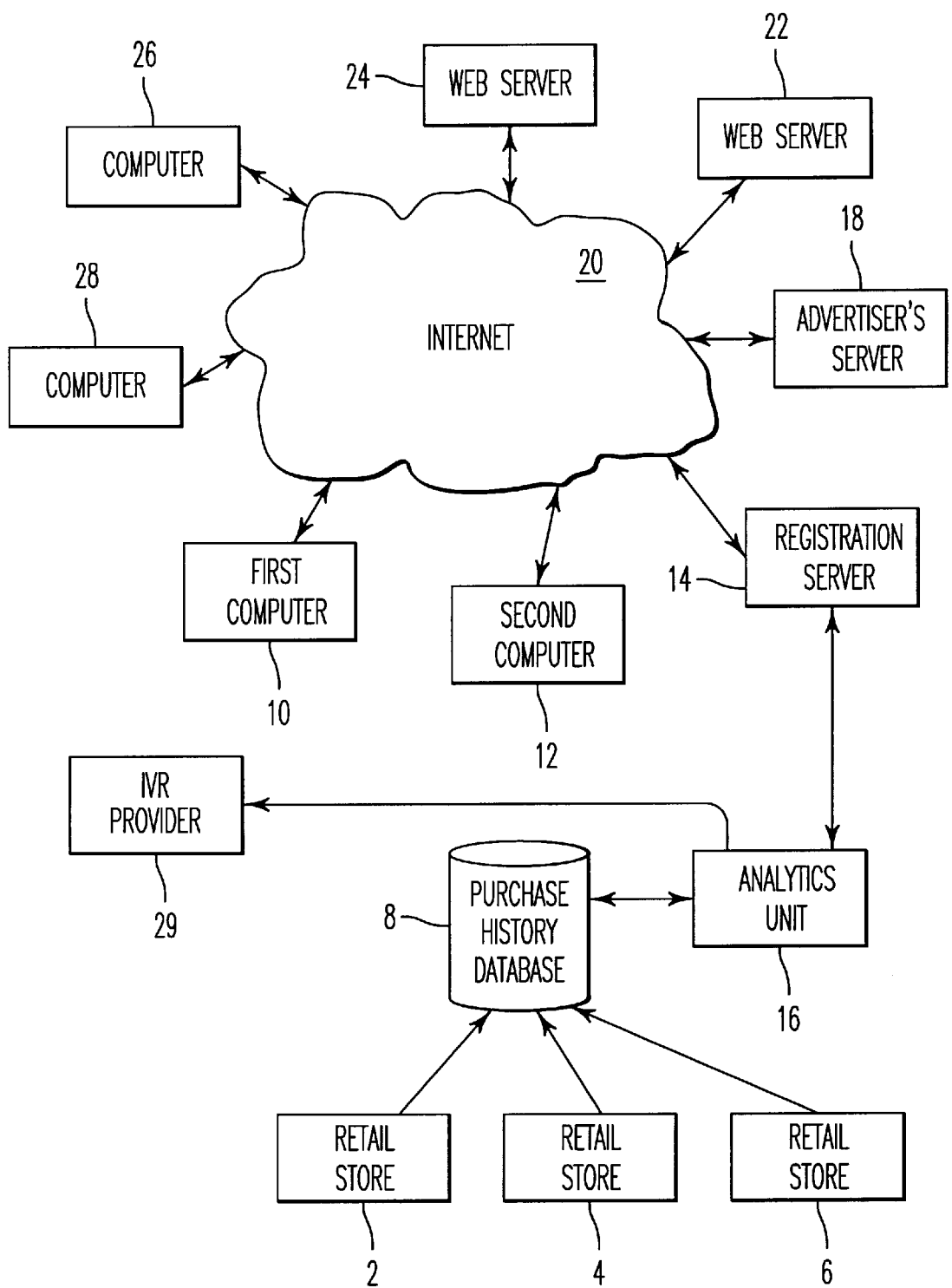
FIG. 1 is a block diagram illustrating a system for associating a consumer's computer with his offline purchase history and delivering targeted advertisements to the consumer over a computer network.

Referring now to the drawings, wherein like reference numerals designate identical or corresponding parts throughout the several views, and more particularly to FIG. 1 thereof, a system illustrative of the present invention is shown. The system includes stores 2, 4, 6; a purchase history database 8; a first computer 10; a telephone 11; a second computer 12; a registration server 14; an analytics unit 16; an advertiser's server 18; a wide area network (WAN) such as the Internet 20; various computers linked to the Internet 20, such as Web servers 22, 24, and computers 26, 28, for example; and an interactive voice response (IVR) provider 29.

Each customer or consumer is provided with a customer identification (CID) that identifies the particular consumer. The CID can be any identifier that is scanned, read, or otherwise entered into a computer system at checkout. Preferably, the CID is represented as a bar code so that it can be quickly scanned at checkout, although any other type of machine-readable (or non-machine readable) implementations for storing or displaying identifications may be used, including magnetic strip and computer or memory chips on a card (e.g., smart cards). Examples of possible CIDs are credit card numbers, debit card numbers, social security card numbers, driver's license numbers, checking account numbers, street addresses, names, e-mail addresses, telephone numbers, frequent customer card numbers, shopper card identifications (SCIDs), or shopper loyalty card numbers issued by one of the stores 2, 4, and/or 6, although any suitable form of identification may be used.

The stores 2, 4, 6 may be any retail location, point of sale, or other location in which offline transactions are made by consumers. The stores 2, 4, 6 record purchase data for the consumers that present their CIDs at checkout. The purchase data includes information such as the location of the purchase, the items purchased, the price of each item purchased, and CID. The purchase information can be stored electronically in a general purpose computer in each of the stores 2, 4, 6 and sent to the purchase history database 8 periodically, in real time, or at any other time when it is desirable to update the purchase history database 8.

The purchase history database 8 may be implemented using any desired structure including any type of computer connected to any type of storage device including magnetic disks such as one or more hard disk drives, optical disks, magneto-optical disks, memory chips, or other desired storage devices. The purchase history database 8 stores purchase data received from the stores 2, 4, 6. The purchase data may be stored in separate master records for each consumer, as described below with reference to FIGS. 2(a) and 2(b). U.S. Pat. Nos. 5,832,457, 5,649,114, 5,430,644, and 5,592,560 describe techniques for collecting consumer purchase information and for storing such information in a purchase history database 8. U.S. Pat. Nos. 5,832,457, 5,649,114, 5,430,644, and 5,592,560 and all references cited therein are incorporated herein by reference. Additionally, techniques for collecting consumer purchase information and for storing such information in a purchase history database 8 are described in other patents owned by Catalina Marketing and/or Catalina Marketing International. Each patent owned by Catalina, Catalina Marketing, and/or Catalina marketing international is incorporated herein by reference.

Figure 12:
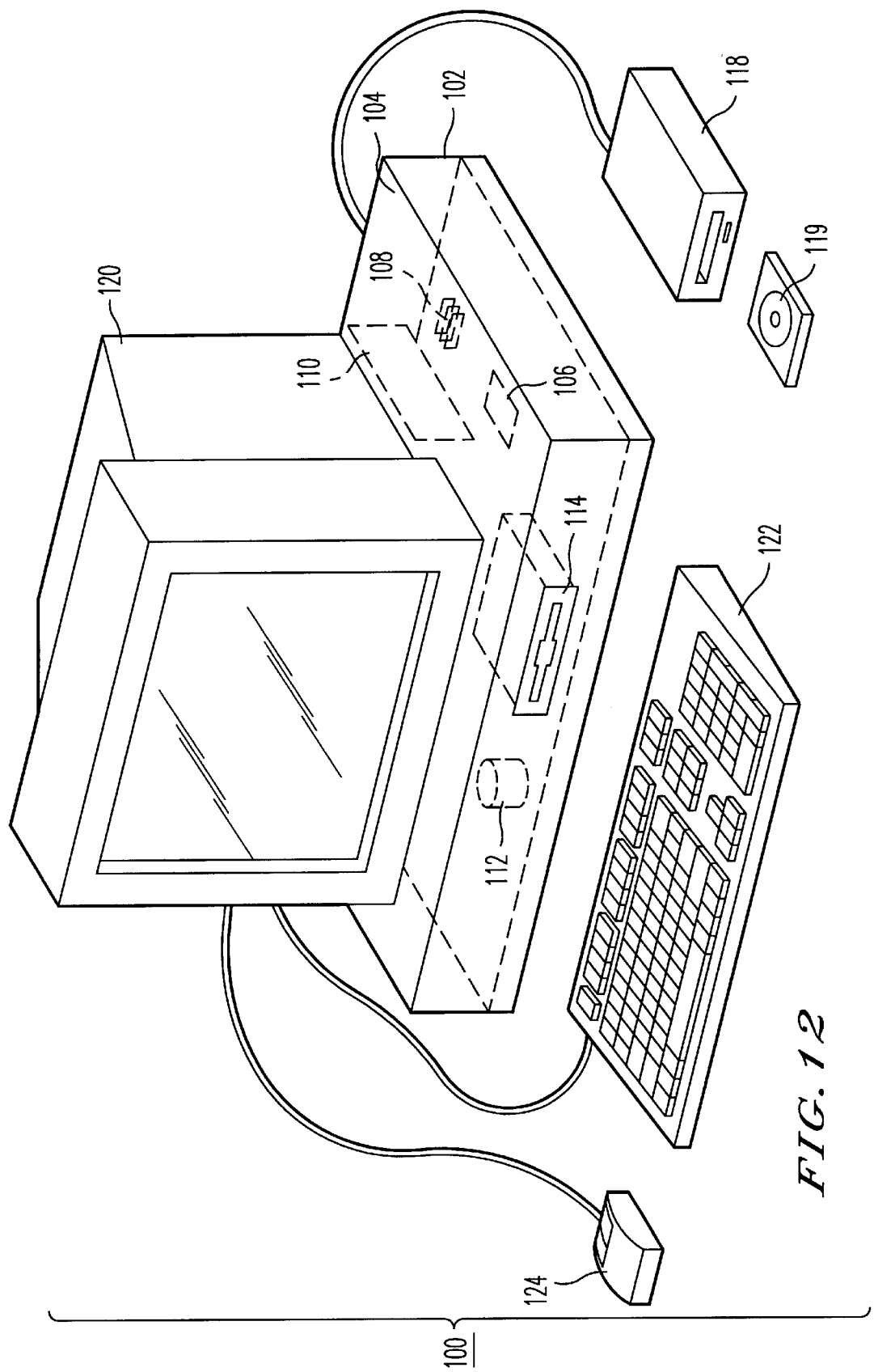
FIG. 12 is a schematic diagram of a general purpose computer system 100 that can be programed to perform the special purpose function(s) of one or more of the devices shown in the system of FIG. 1.

The first and second computers 10, 12, the registration server 14, the advertiser's server 18, Web servers 22, 24, and computers 26, 28 may each be implemented as a general purpose computer (e.g., the computer 100 of FIG. 12). The first and second computers 10, 12, the registration server 14, the advertiser's server 18, Web servers 22, 24, and computers 26, 28 may be appropriately programmed to communicate with one another over a wide area network (WAN) such as the Internet 20.

The first and second computers 10, 12 may be any computer that one or more consumers can access, such as home or office computers. The first and second computers 10, 12, may also be implemented as interactive television sets or other structure suitable for receiving interactive advertisements. Interactive television systems are described in U.S. Pat. Nos. 4,847,700, 5,721,583, and 5,552,735. U.S. Pat. Nos. 4,847,700, 5,721,583, and 5,552,735 and all references cited therein are incorporated herein by reference. The first and second computers 10, 12 may be programmed with any suitable Web browser software that permits the first and second computers 10, 12 to retrieve Web pages via the Internet 20 from remote computers or servers such as the advertiser's server 18 and/or the registration server 14. The Web browser software may also be used to transmit registration information provided by a consumer to a remote computer such as the advertiser's server 18 and the registration server 14.

The registration server 14 is a Web server programmed to receive, store, and/or transmit various type of information, including registration information, purchase behavior information, and information for identifying consumers, although the registration server may also be implemented using any type of computer. The registration server 14 may additionally be programmed to generate records that link various types of registration information received from consumers and the advertiser's server 18.

The analytics unit 16 may be implemented using any desired structure such as a computer programmed to analyze purchase data (e.g., master records) received from the purchase history database 8. Thus, the analytics unit 16 may be programmed to receive purchase behavior criteria from a remote computer (e.g., the registration server 14 and/or the advertiser's server 18) and apply those criteria to the purchase data in the purchase history database 8 to classify consumers into one or more purchase behavior classifications. As shown, the analytics unit 16 communicates directly with the purchase history database 8, the registration server 14, and the IVR provider 29; however, the analytics unit 16 may also be connected to other remote computers (e.g., the advertiser's server 18) directly, via the Internet 20, or through any network.

The advertiser's server 18 may be a Web server programmed to send and receive registration information to and from a remote computer such as the first computer 10. The advertiser's server 18 may also be programmed to exchange information with the registration server 14, to associate a remote computer with one or more registered consumers, and to deliver targeted advertisements over the Internet to remote computers such as the first and second computers 10, 12. Different types of targeted advertisements, include Internet banners, real time moving videos, video information, animation information, audio information, online interstitial advertisements, electronic mailings (e-mails), interactive television advertisements, and any other type of message, recording, and/or display.

The Internet 20 includes various networks and gateways for linking together various computer networks and computers such as the first and second computers 10, 12, Web servers 22, 24, and computers 26, 28. The advertiser's server 18, the Web server 22, and/or the Web server 24 may be appropriately programmed with server software for delivering Web pages to remote clients or computers such as the first and second computers 10, 12. The Web servers 22, 24 may be any servers connected to the Internet 20, including servers that are maintained by one or more advertisers and programmed to deliver targeted advertisements to consumers via the Internet 20. Likewise, the computers 24, 26 may be any server or client with access to the Internet 20. Thus, the computers 26, 28 may be home computers on which consumers may register with the registration server 14 or Web servers programmed to function similar to the registration server 14 or the advertiser's server 18.

The IVR provider 29 is any system that includes at least one computer programmed to store and play IVR messages to consumers. The IVR provider 29 exchanges information with the analytics unit 16. Consumers use a telephone 11, for example, to provide inputs to the IVR provider and receive IVR messages from the IVR provider. The telephone 11 is any device suitable for sending inputs (such as voice or touch tone commands) and receiving IVR messages.

It is emphasized that the system of FIG. 1 is for exemplary purposes only, as many variations of the hardware used to implement the present invention will be readily apparent to one having ordinary skill in the art. For example, the analytics unit 16 may incorporate the purchase history database 8. As another example, the registration server 14 may incorporate the advertiser's server 20. To implement these variations as well as other variations, a single computer (e.g., the computer 100 of FIG. 12) may be programmed to perform the special purpose functions of two or more of any of the devices shown in FIG. 1. On the other hand, two or more programmed computers may be substituted for any one of the devices shown in FIG. 1.

The present invention stores information relating to each consumer's observed offline purchase history and identifying information corresponding to each consumer in one or more memories such as a hard disk, optical disk, magneto-optical disk, and/or RAM, for example. The stored information may include the purchase history, CID, cookie number, and targeted ad profile for each consumer. One or more databases may store the information used to implement the present invention. The databases are organized using data structures (e.g., records, tables, arrays, fields, and/or lists) contained in a memory such as a hard disk, floppy disk, optical disk, or RAM, for example.

FIG. 2(a) shows a master record 30 for storing purchase information for a particular CID corresponding to a particular consumer. A separate master record 30 for each CID is maintained in the purchase history database 8. The master record 30 may be implemented as a data structure that includes a field 31 for storing the consumer's CID as well as a table 32 for identifying and describing each purchase made by the consumer. The table 32 may include one or more linked lists, for example, or an array of purchase records.

FIG. 2(b) shows an exemplary purchase record 33 which may be implemented as part of the master record 30. The purchase record 33 includes a field 34 for indicating the shelf keeping unit (SKU) which is a distinct product such as "one 2 liter bottle of Brand Z soda," a field 35 for the universal product code (UPC) which is usually seen as a bar code on a product, a field 36 for the location of the purchase, a field 37 for the price per SKU, and a field 38 for the date of purchase. Additional fields and/or columns may be added to the purchase record 33 as desired. Preferably, the master record 30 and/or the purchase record 33 contain at least the information used by the analytics unit 16 to identify or classify consumers, as will be described below with reference to FIG. 8.

Figure 3:
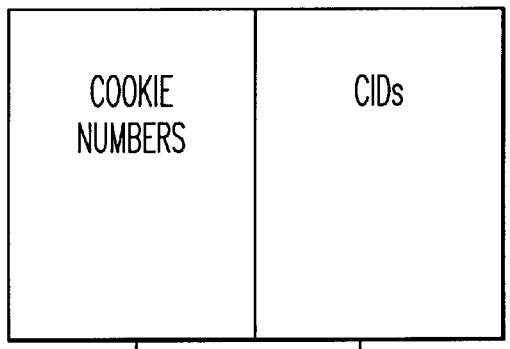
FIG. 3 is a drawing of a data structure for storing a table of first identifiers (cookie numbers) associated with second identifiers (CIDs) in the registration server 14 of FIG. 1.

FIG. 3 illustrates an association table 40 for storing information that associates a computer with a particular consumer and master record. The association table 40 may be implemented as a data structure including a list 42 of first identifiers linked to a list 44 of second identifiers. As shown, the list 42 is a list of cookie numbers. Each cookie number corresponds to a cookie that has been sent to a computer as a result of a consumer registering online with the registration server 14 (described below with reference to FIG. 7). Accordingly, each cookie number identifies a single Web browser run on a computer that was used by a consumer to register. The list 44 is a list of CIDs, each of which corresponds or is linked to the adjacent cookie number in the list 42. Each CID in the list 44 is also stored in the purchase history database 8 in a master record. Thus, the association table 40 links a Web browser (via the cookie number) with a master record (via the CID) for a consumer who used the Web browser to register online. The association table 40 may be stored in the registration server 14 or any other suitable storage device including any of the devices shown in FIG. 1 (e.g., the registration server 18). As technology progresses, cookies may become associated with individuals and not directly correspond to a Web browser, and the invention includes the use of identification methods other than conventional cookies.

The association table 40 may contain additional lists and/or fields. For example, it may be desirable for the association table 40 to include a field that identifies the association table 40 if multiple association tables are generated and stored. Preferably, the association table 40 stores at least one list of identifiers which are also stored in the purchase history database 8 and which identify registered consumers.

Figure 4A:
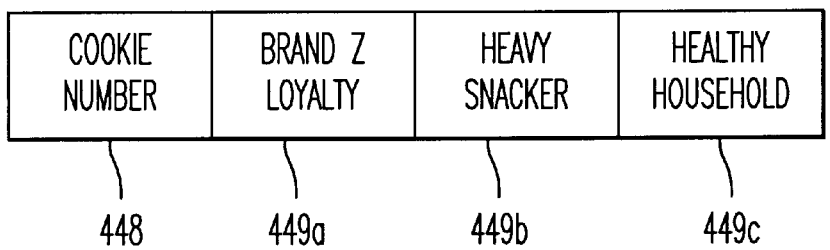
FIG. 4(a) is a drawing of a targeted ad profile implemented as a data structure and stored in the advertiser's server 18 of FIG. 1.

FIG. 4(a) is an exemplary targeted ad profile 446 for storing information relating to a consumer's purchase behavior classification. The targeted ad profile 446 may be a data structure that includes a record having a field 448 for identifying the consumer. As shown, the field 448 stores the cookie number associated with the consumer. The targeted ad profile 446 may include additional fields for storing the consumer's purchase behavior classification with regard to one or more purchase behavior criterion. The targeted ad profile 446 includes three fields, 449a, 449b, and 449c, for three purchase behavior classifications: Brand Z loyalty, Heavy Snacker, and Healthy Household, respectively. Each purchase behavior classification may be given any score (e.g., an integer), a describer (e.g., "Brand Z loyalist" or "Heavy Brand Z User"), flag ("1" or "0"), or rank (e.g., "$50^{th}$ out of 50,000") that the consumer has received based on selected purchase behavior criteria which are discussed below with reference to FIG. 8.

The targeted ad profile 446 is preferably generated by the analytics unit 16 or another device in close proximity to the purchase history database 8. However, the targeted ad profile may be generated by any suitable device including any of the other devices shown in FIG. 1 (e.g., the registration server 14). If desired, multiple targeted ad profiles may be generated for each consumer. Also, the targeted ad profiles may be updated as often as desired to capture consumers' behavioral changes, i.e., changes in purchase behavior classifications.

Figure 4B:
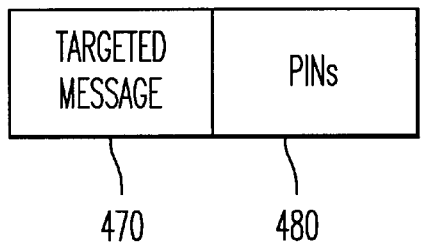
FIG. 4(b) is a drawing of a data structure for storing a unique personal identification number in association with a CID.

FIG. 4(b) shows a data structure 460 that includes a field 470 for storing information identifying a particular targeted message such as an IVR message stored in the IVR provider 29. An IVR message includes one or more recorded voice messages that are played for a consumer. Different messages may be played in response to inputs received from the consumer over a telephone network. The input may include information that is delivered orally or by touch tone. For example, the IVR message may begin by playing the consumer a message that states, "Speak or press '1' if you prefer brand X over brand Y; speak or press '2' if you prefer brand Y, but would be willing to try brand X." Thus, a single IVR message may include numerous sequences and/or variations of recordings to be played to the consumer, and the input received from the consumer at each prompt determines which particular recordings of the IVR message are played to the consumer.

The data structure 460 also includes a field 480 for storing a list of PINs associated with the IVR message stored in field 470. The PINs may include numbers but should not be limited to numbers and may include, if desired, alphabetic, typographic, or any type of identifying information including CIDs, telephone numbers, cookie numbers, any personal attribute such as voice, fingerprint, or facial characteristics, and random strings of alphanumeric characters. The data structure 460 is generated in the analytics unit 16 and sent to the IVR provider 29 so that the IVR provider 29 can receive a PIN from a consumer and play the corresponding IVR message. Multiple data structures such as the data structure 460 can be generated so that different IVR messages correspond to different lists of PIN numbers. Each IVR message is associated with a particular purchase history classification so that each consumer hears an IVR message that reflects his or her offline purchase history.

The data structures embodied by the present invention include the data structures shown in FIGS. 2(a), 2(b), 3, 4(a), and 4(b) and described above. Alternatively, any other desired manner of implementing the data structures embodied by the present invention may be equivalently implemented so that the desired functionality and corresponding practical application are achieved.

Figure 5:
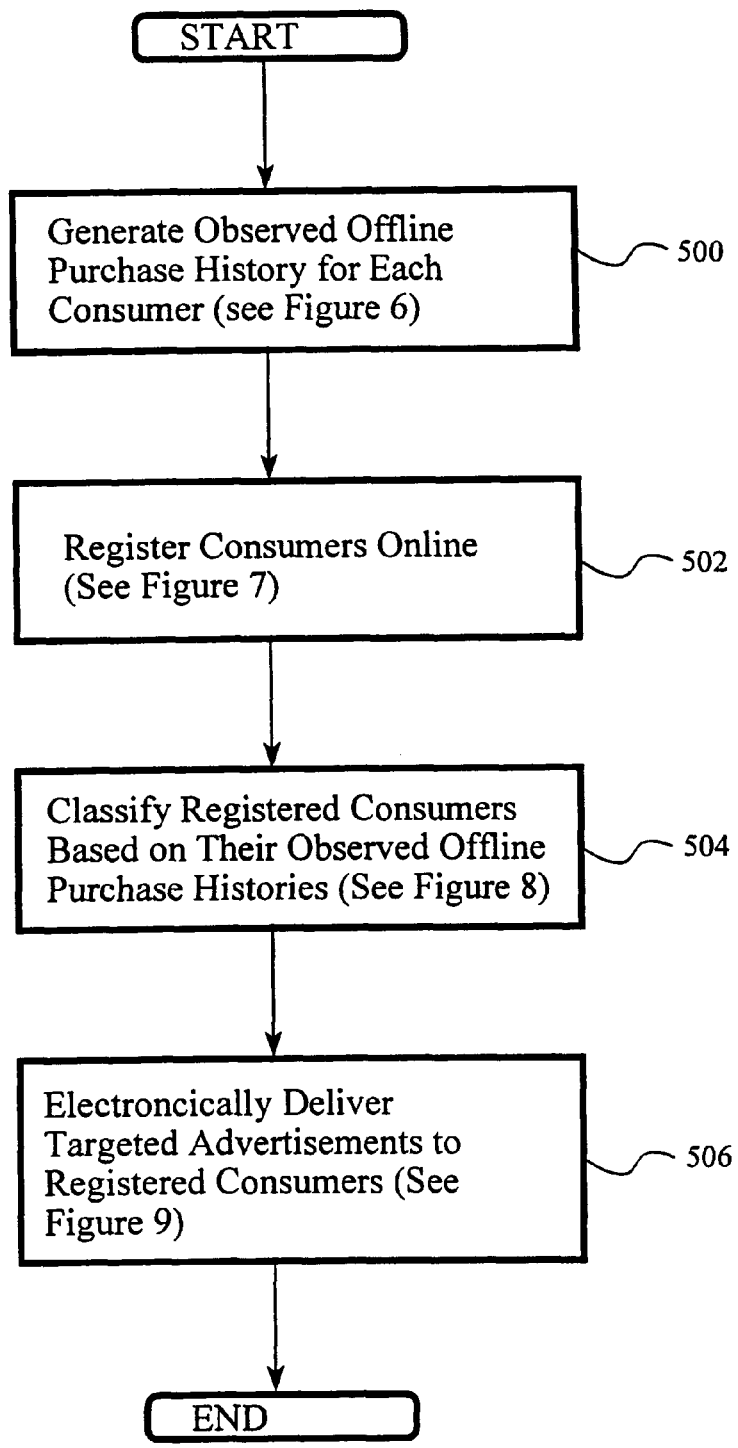
FIG. 5 is a flowchart showing the general process for implementing the present invention with the system of FIG. 1.

FIG. 5 is a flowchart that shows the general process for implementing the invention. Each of the steps of FIG. 5 includes two or more substeps which are described below with reference to FIGS. 6, 7, 8, and 9.

Referring back to FIG. 5, the purchase history database 8 is populated with the actual, monitored, or observed offline purchase histories of consumers in step 500. Further details of this step are described below with respect to FIG. 6. The offline purchase histories are organized into master records, each corresponding to a CID or other identifier associated with a particular consumer.

In step 502, each consumer registers online using a computer. As a result of the registration process, each computer is associated with the offline purchase history of the consumer that used the computer to register. Further details of step 502 and the registration process are set forth below in the description of FIG. 7.

In step 504, the registered consumers are classified by assigning each consumer a purchase behavior classification. The purchase behavior classification is assigned to each consumer according to predefined purchase behavior criteria applied to the consumer's observed offline purchase history. Further details of this step are set forth in the description of FIG. 9.

In step 506, targeted advertisements are electronically delivered to the respective computers of registered consumers. The targeted advertisements are selected based on the purchase behavior classification assigned in step 504. Thus, a first consumer using the first computer 10 may receive an advertisement different from the one received by a consumer using the second computer 12. The difference in the advertisements will be, at least in part, caused by differences in the first and second consumer's respective purchase behavior classifications. Further details of step 506 are described with respect to FIG. 506.

Figure 6:
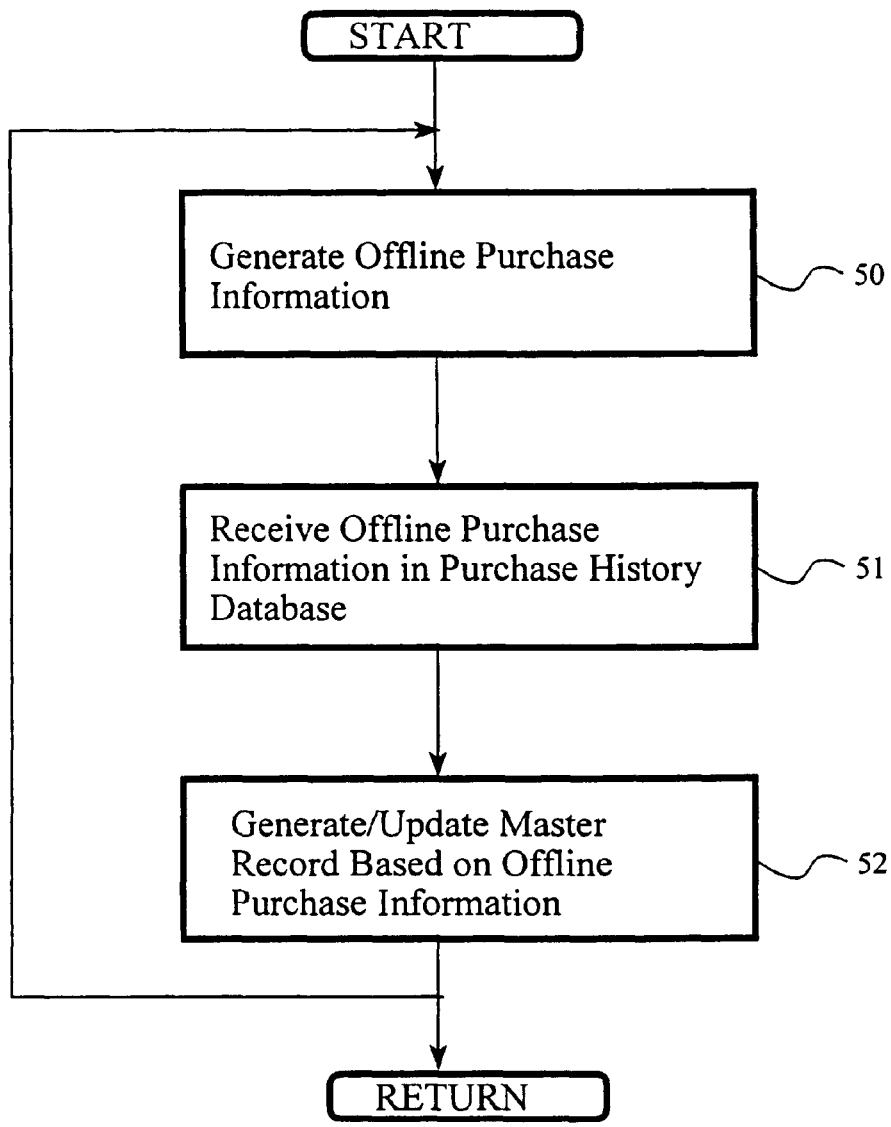
FIG. 6 is a flowchart showing how the purchase history database may be populated with the observed offline purchase histories of consumers.

FIG. 6 is a flowchart of the process of step 506 of FIG. 5 and shows how consumers' offline purchase histories are observed, recorded, and updated. After starting, in step 50, the consumer's offline purchase information is obtained. This information is obtained in the preferred embodiment by a computer used to implement a sale or sales transaction to a user and may utilize a general purpose computer or point of sale terminal. If a point of sale terminal is used, the purchase history may be obtained using an optical scanner which scans a bar code, UPC code, or SKU on the purchased product.

In step 51, the consumer's observed offline purchase information is received in the purchase history database 8. The observed offline purchase information can be delivered from the stores 2, 4, 6, to the purchase history database 8 via any suitable means, such as an electronic communications network or physical delivery of computer diskettes, tapes, or other portable media containing the purchase information, for example.

In step 52, a master record corresponding to the consumer is created based on the offline purchase information received in step 51. The master record contains at least one identifier, such as the consumer's CID, that distinguishes the consumer's master record 30 from other master records in the purchase history database 8. Steps 50, 51, and 52 may be repeated as necessary to generate master records for additional consumers, as well as to update existing master records by appending new information to an existing master record.

Figure 7:
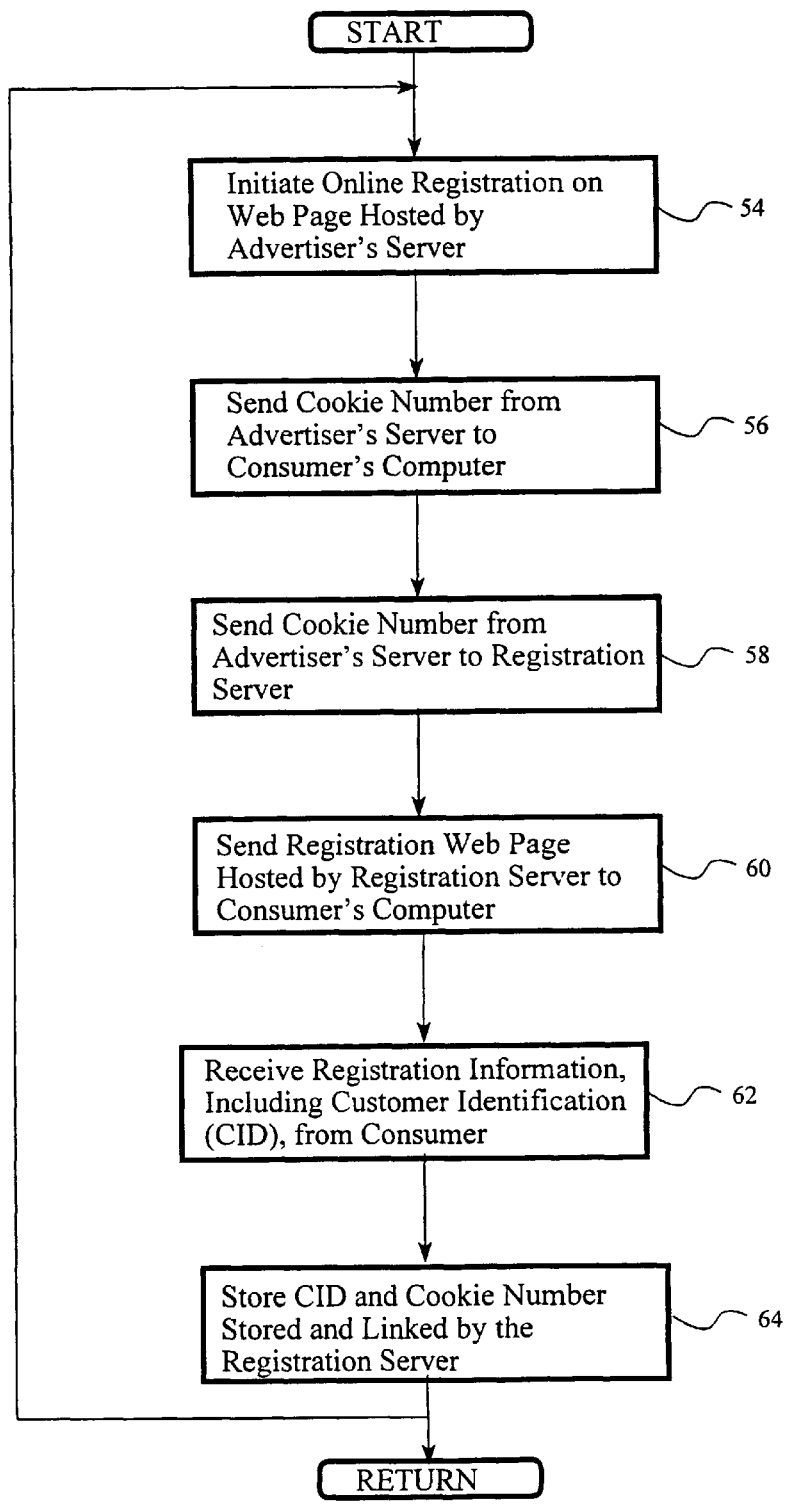
FIG. 7 is a flowchart showing how consumers may register according to the present invention.

FIG. 7 is a flowchart showing how the registration process of step 504 is performed. In step 54, the consumer uses Web browser software on the first computer 10 to initiate the registration process. Registration is initiated by the consumer's selection of a button or other graphic image on a Web page associated with the advertiser's server 18.

Then, in step 56, the advertiser's server 18 sends a cookie to the first computer 10. A cookie is a block of data, a state object, or identification information. The cookie sent to the first computer 10 includes a unique identifier, such as a cookie number or other string of characters, that is stored on the first computer 10 and at the advertiser's server 18. When the Web browser running on the first computer 10 accesses the advertiser's server 18, the Web browser sends a copy of the cookie, including the cookie number, back to the advertiser's server 18. In this manner the advertiser's server recognizes the cookie as being sent from a particular Web browser program associated with a particular consumer. Since the same cookie may be sent to, and recognized by, any server within a predefined range of domain names, other servers, such as Web servers 22, 24, may receive and recognize the cookie (as well as the cookie number) stored in the first computer 10 if the other servers have domain names in the requisite range. In an alternate embodiment, instead of identifying the Web browser program, the identification information may be used to identify the computer of a consumer and/or the consumer himself.

In step 58, the cookie number is sent from the advertiser's server 18 to the registration server 14. The cookie number may be sent from the advertiser's server 18 to the registration server 14 by placing the cookie number in a URL (Uniform Resource Locator) statement. Thus, a cookie can be assigned when a first Web page provided by the advertiser's server 18 is requested by the first computer 10. The first Web page can contain a link to a second Web page provided by the registration server 14. When the consumer selects the link to the second Web page, the cookie number can be placed in the URL statement for the second Web page, and thus sent to the registration server 14.

In step 60, the consumer's Web browser jumps to a registration Web page served by the registration server 14. Then, in step 62, the consumer registers online with the registration server 14 and, in the process, provides the registration server 14 with information, including an identifier found in the master record 30 (e.g., the consumer's CID). The consumer may supply the registration server 14 with information about the consumer to generate an online profile for the consumer. The online profile may include information such as the consumer's name CID, e-mail address, product/brand preferences, demographic information, work address, home address, whether the consumer has any babies, and whether the consumer has any pets such as a cat, dog, bird, or fish. Preferably, the online profile includes at least one item of information that is stored (or is to be stored) in the purchase history database 8. While referred to as an online profile, the profile may be generated or obtained on an offline basis, such as by filling out a card in a grocery store, for example. Other forms of registration may include a consumer entering registration information at a kiosk in the grocery store after scanning the bar code or alternatively swiping the magnetic strip of his or her shopper loyalty card through a magnetic strip reading device. The profile preferably includes information of how to transmit by computer information to the consumer, such as the consumer's e-mail address, IP (Internet protocol) address, or any information which may be used to electronically send information to the consumer, including, for example, through a paging device or a portable computer.

In step 64, the registration server 14 stores the cookie number received from the advertiser's server 18 and the CID received from the first computer 10 in memory and links the cookie number to the CID. Accordingly, an association between the consumer, the consumer's CID, and the first computer 10 results. Once the cookie number and CID are linked, the registration server 14 can use a cookie number to locate a particular master record in the purchase history database 8 based on the CID linked to that cookie number. Further, the registration server 14 can use a cookie number to identify a particular consumer to an advertiser without divulging the consumer's CID.

Accordingly, after steps 54 through 64 have been performed, the consumer has completed registration with the system. Additional consumers may register in the same manner as described in steps 54 through 64 so that a list of cookie numbers and associated CIDs is generated for the registered consumers. The list of cookie numbers and the list of CIDs may be stored in the fields 35 and 36, respectively, of the association table 40 of FIG. 3.

Different servers, such as Web servers 22, 24, including the registration server 14, may be programmed to perform the same function as the advertiser's server 20, and thus, servers other than the advertiser's server 20 may be used to initiate registration in steps 54 through 58. Accordingly, the registration server 14 may store one or more association tables corresponding to different lists of cookie numbers generated by different servers in steps 54 through 58. Preferably, the master records for each consumer continue to be updated after registration to track the consumers' offline purchases and changes in purchase behavior.

Figure 8:
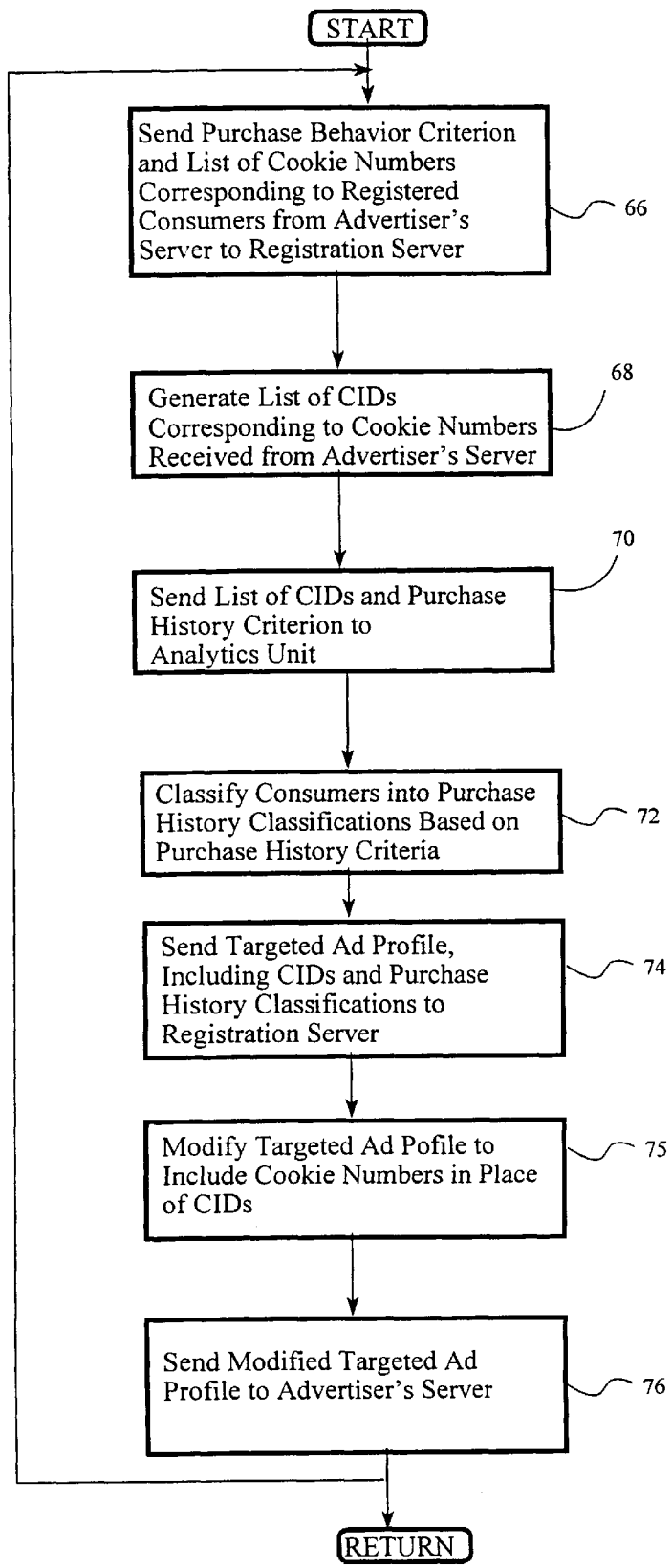
FIG. 8 is a flowchart showing how registered consumers may be classified according to their observed offline purchase histories.

FIG. 8 is a flowchart showing how consumers are classified into one or more purchase behavior classifications based on their observed offline purchases and corresponds to step 506 of FIG. 5. In step 66, the advertiser's server 18 sends to the registration server 14 selected purchase behavior criteria and a list of cookie numbers corresponding to consumers who have registered through the advertiser's server 18. The purchase behavior criteria may be selected using any suitable technique for classifying consumer's observed purchase behavior. Possible techniques for determining purchase behavior criteria include pattern classification, cluster analysis, the use of criteria arbitrarily set by a marketing expert, and/or any other method of classifying consumers into one or more behavioral groups based on their observed offline purchase history. For example, the criterion for a class of "heavy Brand Z drinkers" may be defined as any consumer who has purchased Brand Z at least twice a year in the last month. As another example, the criterion for a class of "Brand Z loyalists" may be defined as any consumer who has purchased Brand Z at least once a month for the last nine months. Regardless of how different criteria are determined, the criteria are preferably based on information derived from marketing research. The purchase behavior criteria do not necessarily have to originate from the advertiser's server 18, but may originate from any suitable remote device such as the computer 26, the Web server 24, and/or the registration server 18.

In step 68, the registration server 14 generates a list of CIDs corresponding to the cookie numbers received from the advertiser's server 18. Thus, step 68 is a matching step in which the registration server identifies a subset of the total number of CIDs to be analyzed in the purchase history database 8. The registration server 14 may use the association table 40 generated in step 64 to identify the CIDs that correspond to the cookie numbers received in step 66.

Next, in step 70, the registration server 14 sends to the analytics unit 16 the purchase behavior criteria received in step 66 and the list of CIDs generated in step 68.

In step 72, the analytics unit 16 analyzes the master records corresponding to the list of CIDs to classify the respective consumers into one or more purchase behavior classifications based on the purchase behavior criteria.

In step 74, the analytics unit 16 sends to the registration server targeted ad profiles for each consumer identified in step 68. Each of the targeted ad profiles includes the consumer's CID and the purchase behavior classification(s) corresponding to that CID. The targeted ad profiles may be stored in a table such as an array or table of records, linked lists, or other suitable data structure.

In step 75, the registration server 14 modifies the targeted ad profiles received from the analytics unit 16 so that the CID for each targeted ad profile is replaced with the corresponding cookie number. To perform this function, the registration server uses the association table 40 to identify the cookie number corresponding to each CID.

In step 76, the registration server 14 sends the modified targeted ad profiles received from the analytics unit 16 to the advertiser's server 20. As discussed above, each targeted ad profile contains the cookie number and the purchase behavior classification(s) associated with a particular consumer. Information, including targeted ad profiles, received from the analytics unit 16 by the registration server 14 may sent to the advertiser's server 20 via any appropriate method, for example, over the Internet 18 or physically delivered on a portable computer readable medium.

Accordingly, in steps 66 through 76, the actual or observed purchase history of the consumers in the purchase history database 8 is analyzed, based on selected purchase behavior criteria, to identify a list of cookie numbers corresponding to consumers who meet the preselected purchase behavior criteria. Steps 66 through 76 may be repeated as necessary so that any number of servers maintained by various advertisers can provide the analytics unit 16 with purchase behavior criteria and cookie numbers of registered consumers (step 66) and receive targeted ad profiles or other purchase behavior information from the analytics unit 16 (step 76).

As demonstrated by the process shown in FIG. 8, advertisers who maintain servers other than the registration server 14 may be provided with targeted ad profiles without being provided with any of the data stored in the purchase history database 8, including CIDs, the consumers' identities, and their observed purchase histories. Thus, if the operator of the registration server 14 is contractually bound to the stores 2, 4, 6 to maintain the consumers' CIDs in secrecy, then the invention may still be practiced without violating the contract and without transmitting the CID.

Figure 9:
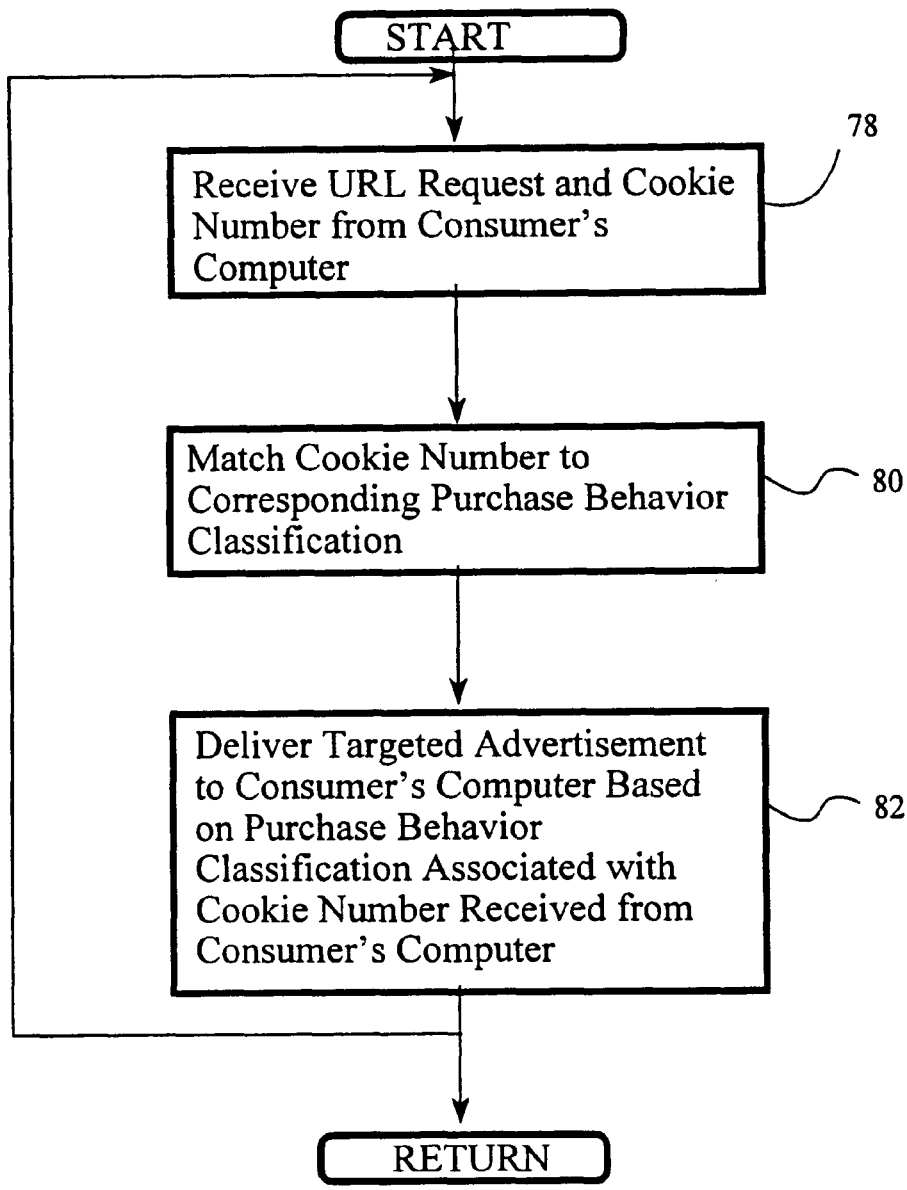
FIG. 9 is a flowchart showing how targeted advertisements may be delivered to registered consumers.

FIG. 9 is a flowchart showing how targeted advertisements are electronically delivered to consumers and corresponds to step 506 of FIG. 5. In step 78, the consumer who was registered by the system in steps 54 through 64 uses the Web browser running on the first computer 10 to make a URL request to a Web site served by advertiser's server 18. Since the advertiser's server 18 has a domain name in the range specified by the cookie sent in step 56, the Web browser will send a copy of the cookie, including the cookie number, to the advertiser's server 18 along with the URL request.

In step 80, the advertiser's server 18 matches the cookie number received from the first computer 10 to the modified targeted ad profile associated with the cookie number. Then, in step 80, the advertiser's server 18 delivers an advertisement to the first computer 10 based on at least one of the purchase behavior classifications stored in the targeted ad profile. In addition to the advertiser's server 18, any host computer or server (for example, Web servers 22, 24, the registration server 14, and/or computers 26, 28) having a domain name within the requisite range defined by the cookie may be programmed to perform steps 78 through 82.

Steps 78 through 82 may be repeated every time a registered consumer uses his or her computer to send a URL request for a Web site served by a Web server that has taken part in the registration process (steps 54 through 76) in the same manner as the advertiser's Web server 18. As noted above, a consumer's online activities may not reveal, or may even contradict, a consumer's offline purchase behavior. The present invention overcomes many of the drawbacks of conventional online advertising by delivering targeted advertisements that are based on what consumers are known to have purchased offline, i.e., their observed offline purchase histories.

Thus, in steps 78 through 82, targeted advertisements are delivered online to the consumer based on the consumer's observed or actual offline purchase behavior. Further, it is not necessary to provide an advertiser with the data in the purchase history database 8 for the advertiser to deliver targeted advertising based on the consumer's observed offline purchase history.

Any variety of targeted advertisements can be delivered to the home computer 12 of the consumer. For example, the advertisements might be for product offers that are only good at stores, such as stores 2, 4, 6, that provide purchase information to the purchase history database 8. In this manner, retail locations, such as stores 2, 4, 6, that are willing to provide purchase data to the purchase history database 8, are rewarded by having their stores' names explicitly mentioned in the targeted advertisements delivered to the consumer. Moreover, if the banner ads are only good at stores where the consumer is known to shop (based on the information in the master record associated with the consumer), then participating stores can be assured that the targeted advertisements will not be used to encourage the consumer to shop at competing stores. For example, the master records for a first consumer and a second consumer show that the first consumer prefers to shop at store 4 and the second consumer prefers to shop at store 6. The analytics unit 16 may be programmed to place the first and second consumers in different purchase behavior classifications, based on their preferred store (among other things). Accordingly, the classifications can be used by the advertiser's server 18 to deliver targeted promotions or coupons that are only recognized at the store where each consumer prefers to shop.

One type of targeted advertisement that can be delivered in step 82 is a value contract. The value contract is a promotional incentive in which the consumer is offered a reward for complying with a particular behavioral pattern such as a predefined change in behavior or the continuance of an established behavior. Any type of reward may be offered. The reward may be "points" which may correspond to, or be redeemed for, cash, cash equivalents, frequent flier miles, minutes of long distance time, minutes of Internet service provider time, coupons, discounts, prizes, or free products, for example. The registration server 14 (or any other suitable server) may be programmed to serve customized Web pages to consumers's computers. Such customized Web pages may display such information as a consumer's accumulated points and the various prizes, rewards, etc. that can be "purchased" with the points. The reward may also be an e-mail message with a password for a Web page full of coupons and customized according to the consumer's observed offline purchase history, for example. The e-mail may also have a link that the consumer can select to start the Internet software on his or her computer and request a customized Web page of coupons.

As discussed above, the value contract may be a promotional incentive for consumers to change existing behavior or continue an established behavior, as determined from the consumer's offline purchase histories. Thus, in order for a consumer to fulfill a value contract and receive a reward, the consumer may be required to purchase a preselected amount of a specified product within a predetermined amount of time. The "amount" of product may be measured by volume, weight, cost, shelf keeping unit (i.e., number of products), or any combination thereof. For example, the value contract may require a consumer to purchase at least 5 pounds of Brand X cheese for a total cost of at least $25 dollars to receive the reward. As another example, a consumer may be required to purchase a total of 10 Brand X cheese products for a total cost of at least $30 to receive the reward.

Figure 10:
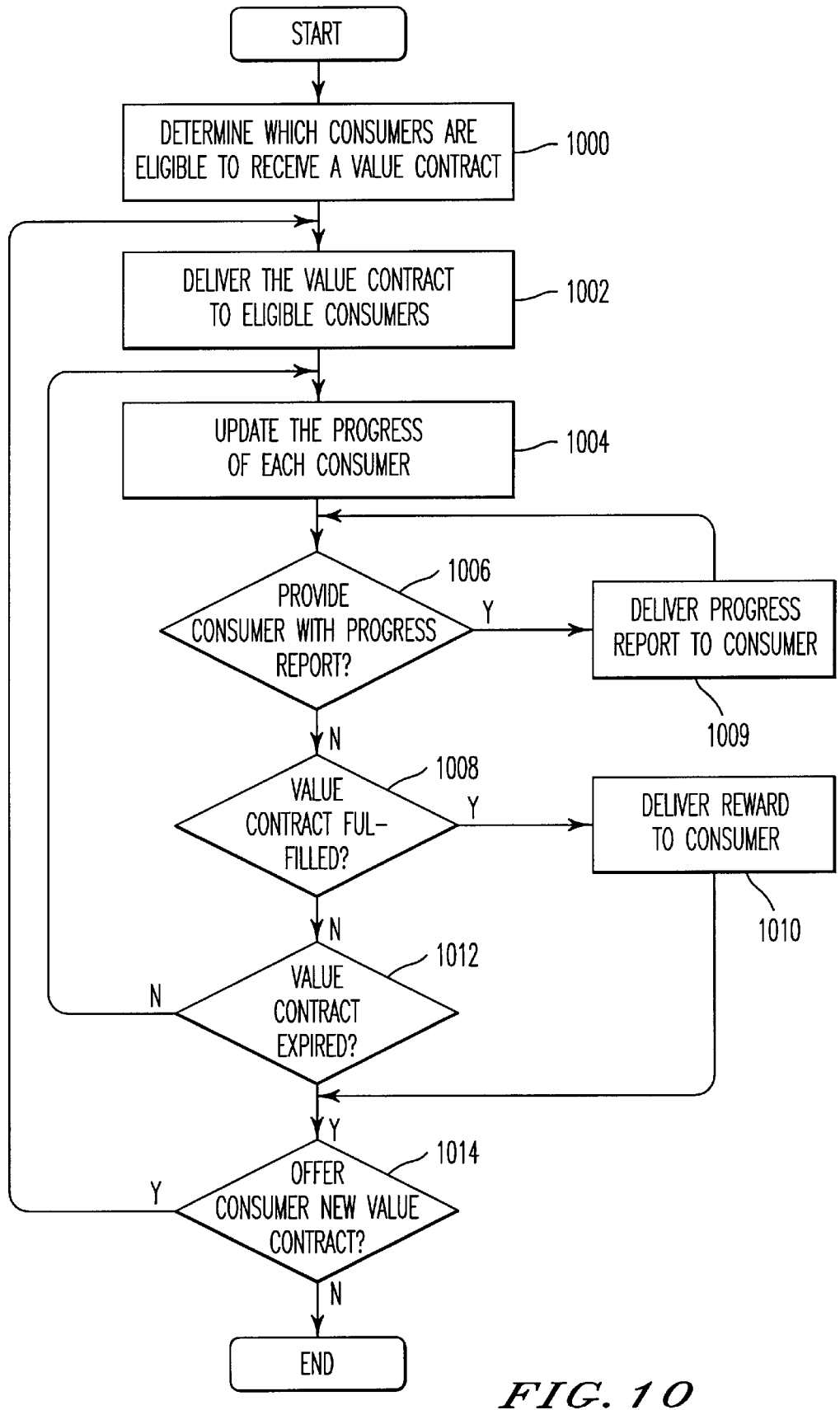
FIG. 10 is a flowchart showing how a value contract may be implemented in accordance with the present invention.

FIG. 10 is a flowchart showing how a value contract may be implemented. In step 1000, the analytics unit 16 searches the purchase history database 8 for consumers whose master records indicate that they are eligible for receiving a value contract offer. The eligibility of each consumer may depend on any desired factor(s) including the purpose of the contract, whether the consumer's observed offline purchase history meets certain criteria, and the consumer's response to previously delivered targeted advertisements including value contracts. As an example, assume the value contract will reward consumers who buy Brand Z soda twice a week. In this case, it may not be desirable to offer the value contract to consumers who are known Brand Z fanatics, i.e., consumers whose observed offline purchase histories indicate that they need no incentive to purchase large quantities of Brand Z soda. Therefore, the criteria used to determine the eligibility of consumers may be "any consumers who have made less than twelve purchases of Brand Z soda in the last six weeks," for example. As another example, the criterion may be "any consumers who made less than ten purchases of Brand Z soda, but more than 10 purchases of Brand X soda in the last six weeks."

In step 1002, the value contract is delivered to the eligible consumers. Step 1002 is analogous to step 506 in FIG. 5. Therefore, step 1002 may be performed by the advertiser's server 18 or another computer programmed to deliver targeted advertisements, e.g., the registration server 14. The value contracts may be delivered by e-mail, Internet banners, or any other suitable technique. In a preferred embodiment, the consumer can use a computer to check a particular Web page on which all value contracts for which the consumer is eligible are displayed. In this embodiment, the value contracts may be Internet banners which are automatically sent to the consumer's computer by a Web server upon recognizing the consumer's computer or upon the consumer's entry of a password, for example.

In step 1004, the analytics unit updates each consumer's progress toward fulfilling the value contract based on the purchase history of the consumer in the purchase history database 8. The progress may be determined by monitoring the purchases by a particular consumer. The consumer may be identified by a frequent shopper or loyalty card, credit or debit card number, checking account number, or using any other identification. Each time a consumer whose identification can be determined makes a purchase, the items purchased along with the consumer's ID are stored in the purchase history database 8.

In step 1006, the registration server 16 determines whether each consumer is to be provided with a progress report which indicates the consumer's progress toward fulfilling the value contract. The progress reports may be provided automatically or may be requested individually by any eligible consumer. For example, e-mails or telephone messages could be automatically generated and sent to the consumers informing them of their progress. Consumers could also be kept abreast of their progress by actively accessing a personalized Web page, calling a predetermined telephone number, and/or by computer generated printout at a point of sale, for example. If the consumer is not to be provided with his or her progress report, then the process proceeds to step 1008. If the consumer is to be provided with his or her progress report, then the process proceeds to step 1009.

In step 1009 the registration server 14 or other suitable device (e.g., a computer in the store 4) delivers the progress report to the consumer. The progress report may be printed at checkout, delivered as an Internet banner by a server that can recognize the consumer's computer, delivered by e-mail, and/or any other suitable method. The message may also offer encouragement, e.g., "Only two more to go. You're almost there!" The consumer may also be provided with ways to check his or her progress toward fulfilling or completing a value club contract by calling a toll free number, checking a particular Web page, suppling his or her CID to a computer terminal in a retail store, and/or any other suitable method. After the consumer is provided with a progress report, the process returns to step 1006.

In step 1008, the analytics unit 16 determines, for each consumer, whether the consumer has fulfilled the value contract. This determination is based on the progress check performed for each consumer in step 1004. If the consumer has not fulfilled the value contract, the process proceeds to step 1012. If the consumer has fulfilled the value contract, the process proceeds to step 1010.

In step 1010, the registration server 14 presents the consumer with a reward for fulfilling the value contract. Delivery of the reward may be conditioned on the behavior of the consumer. For example, acceptance of the reward may require that the consumer to visit a specified retail location such as a specific grocery store. Accordingly, the value contract can be implemented to provide the consumer with an incentive to visit selected locations. The locations may be selected on the consumer's preestablished shopping habits (e.g., the grocery store that the consumer frequents most often), as determined from the master record corresponding to the consumer in the purchase history database 8. After step 1010, the process proceeds to step 1014.

In step 1012, the analytics unit 16 determines whether the value contract offer is still good or open. If the offer is still open, the process returns to step 1004. If the offer is no longer good (for example, if the time for fulfilling the contract has expired), then the process proceeds to step 1014.

In step 1014, the registration server 14 determines whether a new value contract should be offered to consumers who were offered the original value contract in step 1002. This determination may be based on such factors as the consumer's response to the original value contract, the consumer's response to other value contracts in the past, and the consumer's observed offline purchase behavior over a certain period of time. Step 1012 is analogous to step 1000 in that criteria may be used to determine wether consumer who were offered the original value contract should be offered a new value contract. If a new value contract is not offered, then the process ends. If a new value contract is offered, the process returns to step 1002 and the new value contract is delivered.

The conditions of each new value may be different for each consumer who was offered the original value contract. Preferably, the new value contracts are altered for each consumer as each consumer's behavior changes over time. For example, a consumer who has only purchased Brand X soda once in the last six weeks may be offered a first value contract that rewards the consumer for purchasing over two liters of Brand X soda within the next six weeks. If the consumer complies, i.e., the consumer buys over two liters of Brand X soda within six weeks, the consumer may be offered a second value contract that rewards the consumer for purchasing over three liters of Brand X soda within six weeks. If the consumer complies with the second contract, the consumer may be offered a third value contract that rewards the consumer for purchasing six liters of Brand X soda within six weeks.

Thus, as a consumer demonstrates increasing loyalty toward a particular product, the terms of the contract may require that the consumer buy the product more frequently. Likewise, the reward, i.e., the consideration for fulfilling the value contract, may be varied as the consumer's purchase behavior changes. For example, the consumer may be offered a first value contract that requires three purchases of Brand Z cereal, any size, within three weeks. If the consumer complies with the terms of the contract, he or she may be given a ten dollar credit at a particular store. Then, the consumer may be offered a second value contract that requires three purchases of Brand Z cereal within three weeks, but only offered a five dollar credit. If the consumer does not comply with the second value contract, then the consumer may be offered a third value contract that offers an eight dollar reward. The third value contract may also be a modification of the second value contract, e.g., an Internet banner informing the consumer that he or she only has to buy two items of Brand Z cereal to win the five dollar reward. Accordingly, a value contract's reward and/or requirements may be altered to encourage the consumer to continue to engage in desirable behavior and/or to change undesirable behavior. The value contracts, as well as any other targeted advertisements, are preferably updated and/or refined as often as possible to reflect changes in the consumers' observed purchase behaviors over time.

When used as a targeted advertisement, the value contract provides an efficient way to deliver promotional incentives to consumers for whom the promotional incentives will be more meaningful. That is, consumers who already demonstrate desirable purchase behavior, based on their respective master record and/or targeted ad profiles, can be provided with different offers and incentives than consumers who demonstrate purchase behavior which an advertiser wishes to change. It may be undesirable to offer a value contract to consumers who need no reward incentives to comply with the requirements of the value contract, i.e., consumers whose purchase histories indicate that they would fulfill the requirements of the contract without a reward. Also, it may be undesirable to continue to offer rewards to "switchers," i.e., consumers who will buy a particular brand to fulfill certain value contracts but fail to develop a loyalty for that particular brand. The loyalty of a consumer toward a particular brand may be gauged by the consumer's reaction to different incentives—the more loyal the consumer, the smaller the incentive needed to influence the consumer. To encourage continuance of a desired behavior, brand loyalists may be delivered targeted advertisements that provide small rewards for continued loyalty and/or messages that acknowledge and thank the consumer for his or her brand loyalty. On the other hand, consumers who repeatedly resist value contract offers may be offered increasingly higher rewards. Further, consumers who continue to comply with value contracts may be offered decreasingly lower awards.

Figure 11:
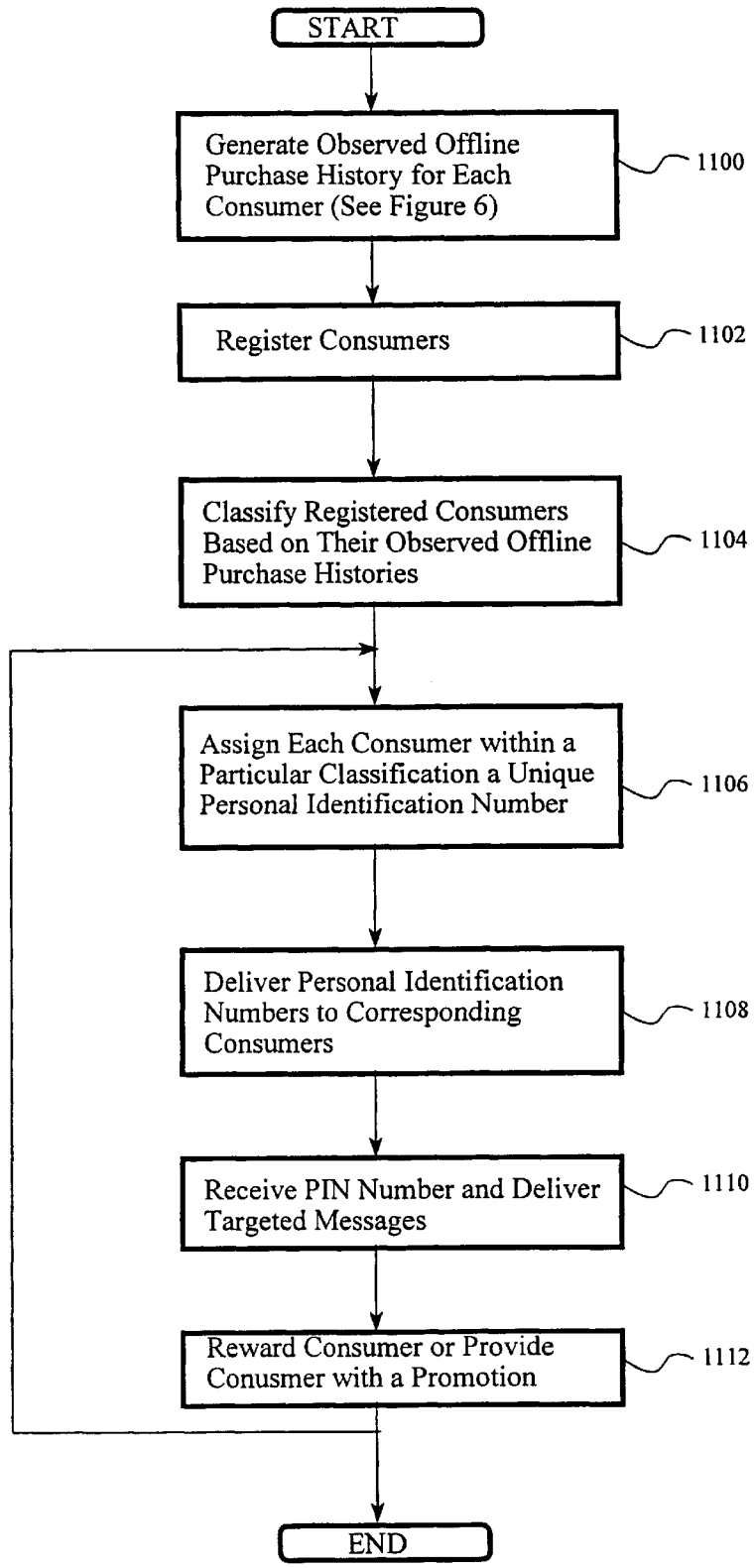
FIG. 11 is a flowchart showing how the present invention may be used to send targeted interactive voice response messages to consumers.

FIG. 11 is a flowchart that shows a process for sending targeted messages to consumers based on their offline purchase history. Such messages may include interactive voice response (IVR) messages which, as discussed above with reference to FIG. 4(*b*), include one or more recordings to be played to a consumer based on inputs received from the consumer over a telephone network. Further, the messages may be audio, visual, or audiovisual messages to be played and/or displayed to a consumer over a computer network such as the Internet 20 based on inputs received from the consumer over the computer network. Messages delivered to the consumer over the computer network may take any appropriate form, including any of the various types of targeted advertisements discussed above (e.g., banner ads, interstitial ads, real time moving videos). The targeted messages delivered over a computer network may have interactive components similar to the IVR messages, such that the message has different branching options to be played in response to receiving different inputs from the consumer over a computer network.

In step 1100 of FIG. 11, the observed offline purchase history for each consumer is generated. This step may be implemented similar to step 500 in FIG. 5 so that master records are generated for each consumer in the purchase history database 8.

Referring back to FIG. 11, consumers are registered in step 1102. Registration may occur online or offline. Online registration may be implemented similar to steps 54 through 64 in FIG. 7. The registration process includes the registration server 14 storing registration information provided by the consumer. The registration information may include the consumer's CID, e-mail address, home address, office address, a cookie number associated with the consumer, telephone number and/or any other information that may be used to deliver targeted messages to the consumer based on his or her offline purchase history.

In step 1104, the analytics unit 16 classifies registered consumers by assigning each consumer a purchase history classification based on his or her offline purchase history. Step 1104 may be implemented similar to step 504 in FIG. 5. Each purchase history classification corresponds to a targeted message, and thus, each consumer is associated with a targeted message. If the targeted messages are IVR message, then they may be stored in the IVR provider 29, for example. If the targeted messages are to be delivered over a computer network such as the Internet 20, then the targeted messages may be stored on any computer connected to the Internet 20, for example, the advertiser's server 18.

In step 1106, the analytics unit 16 assigns a unique PIN to each consumer. Accordingly, each targeted message is associated with a list of PINs for all of the consumers in the purchase history classification that corresponds to that targeted message. A record, such as the data object 460 of FIG. 4(*b*), links the list of PINs for each purchase history classification with the corresponding targeted message, for example. Alternatively, a single PIN is assigned to a group of consumers, preferably having common features, e.g., a common purchase history classification. PINs may be generated and assigned pseudo-randomly, randomly, serially, or in any other suitable manner including those set forth in U.S. patent application Ser. No. 09/059,371, filed Apr. 14, 1998, and entitled "Method and System for using a Frequent Shopper Card as a Phone Calling Card." U.S. patent application Ser. No. 09/059,371 and all references cited therein are incorporated herein by reference. Alternatively, PINs may be based upon an existing number, such as a telephone number or a cookie number corresponding to a consumer.

In step 1108 of FIG. 11, the PINs are delivered to the consumers from the registration server 14 using the registration information obtained in step 1102. The PINs may be delivered via any suitable medium, such as a computer printout at the point of sale in one of the stores 2, 4, 8, e-mail, regular mail, an Internet banner, interactive TV, a personalized Web page, or a computer generated telephone message, for example. If the PINs are already known to the consumers (for example, if the PINs correspond to the consumers' telephone numbers), then the step of delivering PINs to consumers can be omitted. Each consumer is also provided with instructions for contacting a source of targeted messages or targeted message source. As shown in FIG. 1, the targeted message source is any computer connected to the Internet 20 (e.g., advertiser's server 18) and/or the IVR provider 29. However, the targeted message source may be any appropriate system for storing and delivering targeted messages. Thus, the instructions for contacting the targeted message source may include a Web site or a telephone number, for example, for establishing a connection between the targeted message source and the consumer. These instructions may be provided in step 1108 or separately.

If the targeted messages are IVR messages, a consumer may use telephone 11 to dial the IVR provider 29, and input his or her PIN over the telephone via touch tone, dual-tone multi-frequency (DTMF), voice recognition, or any other suitable method. If the PIN is the consumer's telephone number, then the IVR provider 29 may include caller identification hardware to automatically recognize the PIN as the consumer's telephone number. On the other hand, if the targeted messages are delivered to the consumer over a computer network such as the Internet 20, the consumer uses a computer such as the first computer 10 to access a Web site identified in the instructions for contacting the targeted message source. Thus, the instructions may provide the consumer with a URL for the Web site hosted by the advertiser's server 18. If the PIN is a cookie number previously assigned to the consumer's computer, then the cookie number may be automatically sent to the targeted message source as the PIN so that the consumer does not have to manually enter the PIN.

In step 1110, the source of the targeted messages (e.g., IVR provider 29 or advertiser's server 18) receives a PIN from a consumer and the targeted message (e.g., an IVR message or a real time moving video) corresponding to that PIN is initiated. If the targeted message is an interactive message, such as an IVR message or an interactive real time moving video, then the targeted message has several different variations, depending on the input from the consumer. For example, an interactive targeted message may begin by sending the following recording to the consumer: "Press 1 if you prefer Brand X over Brand Y. Press 2 otherwise." After the consumer inputs a 1 or a 2, the next recorded message that the consumer hears will depend on whether the source of the targeted messages receives a 1 or a 2 from the consumer. Alternatively, the targeted message may not have any variations, but may be a message in which the consumer is not given any branching options.

The targeted messages may include targeted advertisements, including promotional offers designed to induce the consumer to engage in a particular pattern of behavior. Thus, the value contract, discussed above with reference to FIG. 10 may be offered in an IVR message or a real time moving video. Also, different value contracts could be offered by the same interactive targeted message through different branching options, depending on which inputs are received from the consumer.

In step 1112, the consumer receives a reward for providing his or her PIN to the targeted message source. The reward may be any of the rewards discussed above for the value contract, including points that accumulate and can be redeemed for a prize. For example, a consumer may receive 10 points each time he or she provides his or her PIN and participates in an IVR message. As another example, the rewards can be delivered as coupons appearing on a personalized Web page, Internet banner, e-mail, regular mail, etc. The targeted messages can also be used to ask asks consumers how and where they would prefer to receive and/or redeem their reward, e.g., at home by e-mail, in retail store X at a kiosk, in retail store Y at a checkout counter. Further, the rewards can be conditioned on the consumer's behavior; for example, the consumer is informed that the reward will only be received once the consumer's shopper card is presented at the checkout counter of retail store Z.

To ensure that consumers do not use the same PIN over and over again to receive a reward, each PIN is preferably only usable once. Once a PIN expires or is used, the process may return to step 1106 to assign new PINs. Alternately, old PINs can be reset by the registration server 16 so that the PINs become usable again. It is also to be noted that step 1112 may be skipped if no reward is necessary to induce consumers to receive targeted messages, or if for any other reason it is undesirable to reward the consumers. This may be the case where the consumers receive information that is valuable to them in the targeted message in step 1110. Thus, a targeted message itself can be structured as a reward, for example, by offering the consumers a value contract or any other information that may be of value to the consumer, including a promotion or information of a discount.

Accordingly, steps 1100 through 1112 may be implemented to engage in different targeted messages with different classifications of consumers. Since the classifications are based on the offline purchase history of the consumers, the targeted messages can be targeted based on the consumers offline tastes and preferences. If the targeted messages are interactive messages, the flexibility of the interactive messages permits each different message to be tailored based on the inputs received from consumer, further enhancing the degree to which advertisements and offers can be targeted.

This invention may be conveniently implemented using a conventional general purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

FIG. 12 is a schematic illustration of a computer 100 for implementing the method of the present invention. A computer 100 implements the method of the present invention, wherein the computer housing 102 houses a motherboard 104 which contains a CPU 106, memory 108 (e.g., random access memory (RAM), dynamic ram (DRAM), static RAM (SRAM), synchronous DRAM (SDRAM), flash RAM, read-only memory (ROM), programmable ROM (PROM), erasable PROM (EPROM), and electrically erasable PROM (EEPROM)), and other optional special purpose logic devices (e.g., application specific integrated circuits (ASICs)) or configurable logic devices (e.g., generic array of logic (GAL) or reprogrammable field programmable gate array (FPGA)). The computer 100 also includes plural input devices (e.g., a keyboard 122 and a mouse 124) and a display card 110 for controlling a monitor 120. In addition, the computer system 100 further includes a floppy disk drive 114; other removable media devices (e.g., a compact disc 119, a tape, and a removable magneto-optical media (not shown)); and a hard disk 112, or other fixed, high density media drives, connected using an appropriate device bus (e.g., a small computer system interface (SCSI) bus, an enhanced integrated device electronics (IDE) bus, or an ultra direct memory access (DMA) bus). Also connected to the same device bus or another device bus, the computer 100 may additionally include a compact disc reader 118, a compact disc reader/writer unit (not shown), or a compact disc jukebox (not shown). Although compact disc 119 is shown in a CD caddy, the compact disc 119 can be inserted directly into CD-ROM drives which do not require caddies. In addition, a printer (not shown) also provides printed listings of master records, targeted ad profiles, lists of identifiers (e.g., CIDs and corresponding cookie numbers), and any other data stored and/or generated by the computer 100.

As stated above, the system includes at least one computer readable medium or memory programmed according to the teachings of the invention and for containing data structures, tables, records, or other data described herein. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user (e.g., a consumer). Such software may include, but is not limited to, device drivers, operating systems and user applications, such as development tools. Such computer readable media further includes the computer program product of the present invention for performing all or a portion (if processing is distributed) of the processing performed in implementing the invention. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. For example, a consumer may provide his or her email address during registration so that targeted advertisements may be delivered to the consumer electronically via e-mail. Additionally, the consumer may register online or offline at any suitable location (such as one of the stores 2, 4, or 6) by providing his or her email address and any additional information, if needed, to associate the consumer's e-mail address with the consumer's master record in the purchase history database. Further, purchase history information may be stored in one or more databases other than the purchase history database 8. It is therefore to be understood that within the scope of the appended claims, the invention may be practiced otherwise than as specifically described herein.

We claim:

1. A method for delivering a targeted advertisement, comprising the steps of:

generating a first identifier corresponding to a first computer;

sending the first identifier to the first computer;

receiving a second identifier corresponding to a consumer from the first computer;

associating the first identifier with the consumer by linking the first identifier to the second identifier corresponding to the consumer;

classifying the consumer by assigning to the consumer a purchase behavior classification based on at least one selected purchase behavior criterion and an observed offline purchase history corresponding to the second identifier;

selecting a targeted advertisement to be delivered to the consumer, based on the purchase behavior classification assigned to the consumer;

receiving from the first computer the first identifier corresponding to the first computer and associated with the observed offline purchase history of the consumer, the offline purchase history including information of an offline purchase of a consumer collected when the offline purchase transpired;

electronically delivering the targeted advertisement to the consumer at the first computer in response to receiving the first identifier from the first computer;

reclassifying the consumer by assigning to the consumer an updated purchase behavior classification based on at least one selected purchase behavior criterion and an updated observed offline purchase history corresponding to the second identifier; and reselecting the targeted advertisement to be delivered, based on the updated purchase behavior classification assigned to the consumer.

2. A method for delivering a targeted advertisement, comprising the steps of:

generating a first identifier corresponding to a first computer;

sending the first identifier to the first computer;

receiving a second identifier corresponding to a consumer from the first computer;

associating the first identifier with the consumer by linking the first identifier to the second identifier corresponding to the consumer;

classifying the consumer by assigning to the consumer a purchase behavior classification based on at least one selected purchase behavior criterion and an observed offline purchase history corresponding to the second identifier;

selecting a targeted advertisement to be delivered to the consumer, based on the purchase behavior classification assigned to the consumer; wherein the targeted advertisement is a promotional incentive for the consumer to comply with a behavioral pattern selected from the group consisting of: a predefined change in purchase behavior and continuance of an established purchase behavior;

receiving from the first computer the first identifier corresponding to the first computer and associated with the observed offline purchase history of the consumer, said purchase history including information of an offline purchase of a consumer collected when the offline purchase transpired; and electronically delivering the targeted advertisement to the consumer at the first computer in response to receiving the first identifier from the first computer;

wherein the step of electronically delivering the targeted advertisement to the consumer comprises: delivering the promotional incentive to the first computer;

wherein the method further comprises the steps of:

reclassifying the consumer by assigning to the consumer an updated purchase behavior classification based on at least one selected purchase behavior criterion and an updated observed offline purchase history corresponding to the second identifier; and reselecting the targeted advertisement to be delivered, based on the updated purchase behavior classification assigned to the consumer.

3. A method for delivering a targeted advertisement, comprising the steps of:

monitoring a consumer's offline purchase at a point of sale when the offline purchase transpires;

determining, using information of the offline purchase collected during the monitoring step, a targeted advertisement to be delivered to the consumer;

electronically delivering the targeted advertisement to the consumer; wherein the targeted advertisement is a promotional incentive for the consumer to comply with a behavioral pattern selected from the group consisting of: a predefined change in behavior and continuance of an established behavior; and wherein the step of electronically delivering the targeted advertisement to the consumer comprises: delivering the promotional incentive to the consumer;

classifying the consumer by assigning to the consumer a purchase behavior classification based on at least one selected purchase behavior criterion and an observed offline purchase history, said purchase history including information of the consumer's offline purchase;

selecting the promotional incentive to be delivered, based on the purchase behavior classification assigned to the consumer;

reclassifying the consumer by assigning to the consumer an updated purchase behavior classification based on the at least one selected purchase behavior cri terion and an updated observed offline purchase history, said updated purchase history including information of an additional offline purchase of the consumer; and reselecting the targeted advertisement to be delivered, based on the updated purchase behavior classification assigned to the consumer.

4. A method for delivering targeted messages, comprising the steps of:

monitoring a consumer's offline purchase at a point of sale when the purchase transpires;

classifying the consumer by assigning to the consumer a purchase behavior classification based on at least one selected purchase behavior criterion and information of the offline purchase collected during the monitoring step;

assigning to the consumer a personal identification number (PIN) associated with the purchase behavior classification; and delivering a targeted message to the consumer in response to receiving the PIN from the consumer, based on the purchase behavior classification associated with the PIN;

wherein the targeted message is an interactive voice response message and the step of delivering a targeted message comprises: playing the interactive voice response message over a telephone network to the consumer in response to receiving the PIN from the consumer, based on the purchase behavior classification associated with the PIN;

wherein the interactive voice response message is a targeted advertisement and the step of playing an interactive voice response message comprises: delivering a targeted advertisement to the consumer based on the consumer's purchase behavior classification;

wherein the targeted advertisement is a promotional incentive for the consumer to comply with a behavioral pattern selected from the group consisting of: a predefined change in purchase behavior and continuance of an established behavior;

wherein the step of delivering the targeted advertisement comprises: delivering the promotional incentive to the consumer;

and wherein the method further comprises the steps of:

reclassifying the consumer by assigning to the consumer an updated purchase behavior classification based on the at least one selected purchase behavior criterion and an additional offline purchase of the consumer; and assigning to the consumer another PIN associated with the updated purchase behavior classification.

5. A computer readable medium containing program instructions for execution on a computer system, which when executed by a computer, cause the computer system to perform method steps for delivering a targeted advertisement, said method comprising the steps of:

generating a first identifier corresponding to a first computer;

sending the first identifier to the first computer;

receiving a second identifier corresponding to a consumer from the first computer;

associating the first identifier with the consumer by linking the first identifier to the second identifier corresponding to the consumer;

classifying the consumer by assigning to the consumer a purchase behavior classification based on at least one selected purchase behavior criterion and an observed offline purchase history corresponding to the second identifier;

selecting the targeted advertisement to be delivered, based on the purchase behavior classification assigned to the consumer;

receiving from the first computer the first identifier corresponding to the first computer and associated with the observed offline purchase history of the consumer, said purchase history including information of an offline purchase collected at a point of sale when the purchase transpired;

electronically delivering the targeted advertisement to the consumer at the first computer in response to receiving the first identifier from the first computer;

reclassifying the consumer by assigning to the consumer an updated purchase behavior classification based on at least one selected purchase behavior criterion and an updated observed offline purchase history corresponding to the second identifier; and reselecting the targeted advertisement to be delivered, based on the updated purchase behavior classification assigned to the consumer.

6. A computer readable medium containing program instructions for execution on a computer system, which when executed by a computer, cause the computer system to perform method steps for delivering a targeted advertisement, said method comprising the steps of:

generating a first identifier corresponding to a first computer;

sending the first identifier to the first computer;

receiving a second identifier corresponding to a consumer from the first computer;

associating the first identifier with the consumer by linking the first identifier to the second identifier corresponding to the consumer;

classifying the consumer by assigning to the consumer a purchase behavior classification based on at least one selected purchase behavior criterion and an observed offline purchase history corresponding to the second identifier;

selecting a targeted advertisement to be delivered, based on the purchase behavior classification assigned to the consumer;

receiving from the first computer the first identifier corresponding to the first computer and associated with the observed offline purchase history of the consumer, said purchase history including information of an offline purchase collected at a point of sale when the purchase transpired;

electronically delivering the targeted advertisement to the consumer at the first computer in response to receiving the first identifier from the first computer; wherein the targeted advertisement is a promotional incentive for the consumer to comply with a behavioral pattern selected from the group consisting of: a predefined change in purchase behavior and continuance of an established purchase behavior; and wherein the step of electronically delivering the targeted advertisement to the consumer comprises: delivering the promotional incentive to the first computer;

reclassifying the consumer by assigning to the consumer an updated purchase behavior classification based on at least one selected purchase behavior criterion and an updated observed offline purchase history corresponding to the second identifier; and reselecting the targeted advertisement to be delivered, based on the updated purchase behavior classification assigned to the consumer.

7. A computer readable medium containing program instructions for execution on a computer system, which when executed by a computer, cause the computer system to perform method steps for delivering a targeted advertisement, said method comprising the steps of:

monitoring a consumer's offline purchase at a point of sale when the offline purchase transpires;

determining, using information of the offline purchase collected during the monitoring step, a targeted advertisement to be delivered to the consumer;

electronically delivering the targeted advertisement to the consumer; wherein the targeted advertisement is a promotional incentive for the consumer to comply with a behavioral pattern selected from the group consisting of: a predefined change in behavior and continuance of an established behavior; and wherein the step of electronically delivering the targeted advertisement to the consumer comprises: delivering the promotion to the consumer;

classifying the consumer by assigning to the consumer a purchase behavior classification based on at least one selected purchase behavior criterion and an observed offline purchase history, said purchase history including information of the consumer's offline purchase;

selecting the promotional incentive to be delivered, based on the purchase behavior classification assigned to the consumer;

reclassifying the consumer by assigning to the consumer an updated purchase behavior classification based on the at least one selected purchase behavior criterion and an updated observed offline purchase history, said updated purchase history including information of an additional offline purchase of the consumer; and reselecting the targeted advertisement to be delivered, based on the updated purchase behavior classification assigned to the consumer.

8. A computer readable medium containing program instructions for execution on a computer system, which when executed by a computer, cause the computer system to perform method steps for delivering targeted messages, said method comprising the steps of:

monitoring a consumer's offline purchase at a point of sale when the purchase transpires;

classifying the consumer by assigning to the consumer a purchase behavior classification based on at least one selected purchase behavior criterion and using information of the offline purchase collected during the monitoring step;

assigning to the consumer a personal identification number (PIN) associated with the purchase behavior classification; and delivering a targeted message to the consumer in response to receiving the PIN from the consumer, based on the purchase behavior classification associated with the PIN;

wherein the targeted message is an interactive voice response message and the step of delivering a targeted message comprises: playing the interactive voice response message over a telephone network to the consumer in response to receiving the PIN from the consumer, based on the purchase behavior classification associated with the PIN;

wherein the interactive voice response message is a targeted advertisement and the step of playing an interactive voice response message comprises: delivering the targeted advertisement to the consumer based on the consumer's purchase behavior classification;

wherein the targeted advertisement is a promotional incentive for the consumer to comply with a behavioral pattern selected from the group consisting of: a predefined change in purchase behavior and continuance of an established behavior;

wherein the step of delivering the targeted advertisement comprises: delivering the promotional incentive to the consumer;

and wherein the computer readable medium further comprises computer-executable instructions for causing the computer system to perform the steps of:

reclassifying the consumer by assigning to the consumer an updated purchase behavior classification based on the at least one selected purchase behavior criterion and an additional offline purchase of the consumer; and assigning to the consumer another PIN associated with the updated purchase behavior classification.

9. A system for delivering a targeted advertisement, comprising:

means for generating a first identifier corresponding to a first computer;

means for sending the first identifier to the first computer;

means for receiving a second identifier corresponding to a consumer from the first computer;

means for associating the first identifier with the consumer by linking the first identifier to the second identifier corresponding to the consumer;

means for classifying the consumer by assigning to the consumer a purchase behavior classification based on at least one selected purchase behavior criterion and an observed offline purchase history corresponding to the second identifier;

means for selecting a targeted advertisement to be delivered, based on the purchase behavior classification assigned to the consumer;

means for receiving from the first computer the first identifier corresponding to the first computer and associated with the observed offline purchase history of a consumer, said purchase history including information of an offline purchase of the consumer collected at a point of sale when the purchase transpired;

means for electronically delivering the targeted advertisement to the consumer at the first computer in response to receiving the first identifier from the first computer;

means for reclassifying the consumer by assigning to the consumer an updated purchase behavior classification based on at least one selected purchase behavior criterion and an updated observed offline purchase history corresponding to the second identifier; and means for reselecting the targeted advertisement to be delivered, based on the updated purchase behavior classification assigned to the consumer.

10. A system for delivering a targeted advertisement, comprising:

means for generating a first identifier corresponding to a first computer;

means for sending the first identifier to the first computer;

means for receiving a second identifier corresponding to a consumer from the first computer;

means for associating the first identifier with the consumer by linking the first identifier to the second identifier corresponding to the consumer;

means for classifying the consumer by assigning to the consumer a purchase behavior classification based on at least one selected purchase behavior criterion and an observed offline purchase history corresponding to the second identifier;

means for selecting the targeted advertisement to be delivered, based on the purchase behavior classification assigned to the consumer;

means for receiving from the first computer the first identifier corresponding to the first computer and associated with the observed offline purchase history of the consumer, said purchase history including information of an offline purchase of the consumer collected at a point of sale when the purchase transpired;

means for electronically delivering the targeted advertisement to the consumer at the first computer in response to receiving the first identifier from the first computer; wherein the targeted advertisement is a promotional incentive for the consumer to comply with a behavioral pattern selected from the group consisting of: a predefined change in purchase behavior and continuance of an established purchase behavior; and wherein the means for electronically delivering the targeted advertisement to the consumer comprises: means for delivering the promotional incentive to the first computer;

means for reclassifying the consumer by assigning to the consumer an updated purchase behavior classification based on at least one selected purchase behavior criterion and an updated observed offline purchase history corresponding to the second identifier; and means for reselecting the targeted advertisement to be delivered, based on the updated purchase behavior classification assigned to the consumer.

11. A system for delivering a targeted advertisement, comprising:

means for monitoring a consumer's offline purchase at a point of sale when the offline purchase transpires;

means for determining, using information of the offline purchase collected by the means for monitoring, a targeted advertisement to be delivered to the consumer;

means for electronically delivering the targeted advertisement to the consumer; wherein the targeted advertisement is a promotional incentive for the consumer to comply with a behavioral pattern selected from the group consisting of: a predefined change in behavior and continuance of an established behavior; and wherein the means for electronically delivering the targeted advertisement to the consumer comprises: means for delivering the promotional incentive to the consumer;

means for classifying the consumer by assigning to the consumer a purchase behavior classification based on at least one selected purchase behavior criterion and an observed offline purchase history, said purchase history including information of the consumer's offline purchase;

means for selecting the promotional incentive to be delivered, based on the purchase behavior classification assigned to the consumer;

means for reclassifying the consumer by assigning to the consumer an updated purchase behavior classification based on the at least one selected purchase behavior criterion and an updated observed offline purchase history, said updated purchase history including information of an additional offline purchase of the consumer; and means for reselecting the targeted advertisement to be delivered, based on the updated purchase behavior classification assigned to the consumer.

12. A system for delivering targeted messages, comprising:

means for monitoring a consumer's offline purchase at a point of sale when the purchase transpires;

means for classifying the consumer by assigning to the consumer a purchase behavior classification based on at least one selected purchase behavior criterion and using information of the offline purchase collected by the means for monitoring;

means for assigning to the consumer a personal identification number (PIN) associated with the purchase behavior classification; and means for delivering an interactive voice response message to the consumer in response to receiving the PIN from the consumer, based on the purchase behavior classification associated with the PIN;

wherein the targeted message is an interactive voice response message and the means for delivering a targeted message comprises: means for playing the interactive voice response message over a telephone network to the consumer in response to receiving the PIN from the consumer, based on the purchase behavior classification associated with the PIN;

wherein the interactive voice response message is a targeted advertisement and the means for playing an interactive voice response message comprises: means for delivering the targeted advertisement to the consumer based on the consumer's purchase behavior classification;

wherein the targeted advertisement is a promotional incentive for the consumer to comply with a behavioral pattern selected from the group consisting of: a predefined change in purchase behavior and continuance of an established behavior;

wherein the means for delivering the targeted advertisement comprises: means for delivering the promotional incentive to the consumer;

and wherein the system further comprises:

means for reclassifying the consumer by assigning to the consumer an updated purchase behavior classification based on the at least one selected purchase behavior criterion and an additional offline purchase of the consumer; and means for assigning to the consumer another PIN associated with the updated purchase behavior classification.

\* \* \* \* \*